United States Patent
Kim et al.

(10) Patent No.: US 11,165,112 B2
(45) Date of Patent: Nov. 2, 2021

(54) POSITIVE ELECTRODE FOR METAL-AIR BATTERY, METAL-AIR BATTERY INCLUDING THE SAME, AND METHOD OF MANUFACTURING CARBON NANOTUBE THIN FILM

(71) Applicants: Samsung Electronics Co., Ltd., Suwon-si (KR); Seoul National University R&DB Foundation, Seoul (KR)

(72) Inventors: Hyunjin Kim, Seoul (KR); Chongrae Park, Seoul (KR); Dongjoon Lee, Suwon-si (KR); Dongmin Im, Seoul (KR); Yeonsu Jung, Seoul (KR); Youngshik Cho, Seoul (KR); Minhoo Byeon, Seoul (KR)

(73) Assignees: SAMSUNG ELECTRONICS CO., LTD., Gyeonggi-do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 174 days.

(21) Appl. No.: 16/043,368

(22) Filed: Jul. 24, 2018

(65) Prior Publication Data
US 2019/0036186 A1 Jan. 31, 2019

(30) Foreign Application Priority Data

Jul. 25, 2017 (KR) .................. 10-2017-0094315
Apr. 24, 2018 (KR) .................. 10-2018-0047321

(51) Int. Cl.
*H01M 12/06* (2006.01)
*H01M 4/88* (2006.01)
(Continued)

(52) U.S. Cl.
CPC ............ *H01M 12/06* (2013.01); *C01B 32/16* (2017.08); *H01M 4/8807* (2013.01);
(Continued)

(58) Field of Classification Search
None
See application file for complete search history.

(56) References Cited

U.S. PATENT DOCUMENTS 8,734,996 B2 5/2014 Feng et al.
9,005,816 B2 4/2015 Amine et al.
(Continued)

FOREIGN PATENT DOCUMENTS

JP 2014181179 A 9/2014
JP 2015516643 A 6/2015
(Continued)

OTHER PUBLICATIONS

EESR issued by the European Patent Office on Nov. 28, 2018 in the examination of European Patent Application No. 18185160.1, which corresponds to above U.S. Appl. No. 16/043,368.
(Continued)

*Primary Examiner* — Barbara L Gilliam
*Assistant Examiner* — Angela J Martin
(74) *Attorney, Agent, or Firm* — Cantor Colburn LLP

(57) ABSTRACT

A positive electrode for metal-air battery, comprising: a plurality of carbon nanotube films comprising a first carbon nanotube layer comprising a plurality of first carbon nanotubes; and a second carbon nanotube layer adjacent to the first carbon nanotube layer and comprising a plurality of second carbon nanotubes, wherein an alignment direction of the plurality of first carbon nanotubes in the first carbon nanotube layer and an alignment direction of the plurality of second carbon nanotubes in the second carbon nanotube layer are different from each other, and wherein an average
(Continued)

specific tensile strength of the plurality of carbon nanotube films is greater than or equal to about 0.1 gigapascal per gram per cubic centimeter and less than or equal to about 1 gigapascal per gram per cubic centimeter.

22 Claims, 19 Drawing Sheets

(51) Int. Cl.
| | |
|---|---|
| *H01M 4/96* | (2006.01) |
| *H01M 12/08* | (2006.01) |
| *H01M 50/44* | (2021.01) |
| *C01B 32/16* | (2017.01) |
| *H01M 4/86* | (2006.01) |
| *B82Y 40/00* | (2011.01) |

(52) U.S. Cl.
CPC ....... *H01M 4/8867* (2013.01); *H01M 4/8875* (2013.01); *H01M 4/96* (2013.01); *H01M 12/08* (2013.01); *H01M 50/44* (2021.01); *B82Y 40/00* (2013.01); *H01M 2004/8684* (2013.01); *H01M 2004/8689* (2013.01)

(56) References Cited

U.S. PATENT DOCUMENTS

| | | | |
|---|---|---|---|
| 9,018,088 B2 | 4/2015 | Kim et al. | |
| 9,321,651 B2 | 4/2016 | Choi et al. | |
| 9,396,829 B2 | 7/2016 | Mann et al. | |
| 9,643,847 B2 | 5/2017 | Rao et al. | |
| 2006/0233692 A1 | 10/2006 | Scaringe et al. | |
| 2007/0036709 A1* | 2/2007 | Lashmore | D01F 9/127 423/447.1 |
| 2013/0126793 A1 | 5/2013 | Hitoe et al. | |
| 2013/0337326 A1 | 12/2013 | Mun et al. | |
| 2014/0057178 A1* | 2/2014 | He | H01M 4/663 429/221 |
| 2014/0349186 A1 | 11/2014 | Burton et al. | |
| 2015/0104697 A1 | 4/2015 | Xia et al. | |
| 2016/0145784 A1* | 5/2016 | Schauer | D04H 1/4374 442/327 |
| 2016/0236936 A1 | 8/2016 | Koziol et al. | |
| 2016/0380273 A1 | 12/2016 | Wu et al. | |
| 2018/0126408 A1 | 5/2018 | Monden et al. | |

FOREIGN PATENT DOCUMENTS

| | | |
|---|---|---|
| KR | 1020130041152 A | 4/2013 |
| KR | 101303061 B1 | 8/2013 |
| WO | 2014051271 A1 | 4/2014 |
| WO | 2016011196 A1 | 1/2016 |
| WO | 2016182018 A1 | 11/2016 |

OTHER PUBLICATIONS

Communication pursuant to Article 94(3) EPC issued by the European Patent Office on Sep. 15, 2020 in the examination of the European Patent Application No. 18185160.1, which corresponds to the U.S. Appl. No. 16/043,368.

Richard S. Baldwin, et al., "Battery Separator Characterization and Evaluation Procedures for NASA's Advanced Lithium-Ion Batteries," NASA Technical Memorandum (TM), May 2010, pp. 1-59, Document ID: 20100021170.

Chitranshi et al., "Carbon Nanotube Sheet-Synthesis and Applications", Nanomaterials, 10, 2023, 2020, 1-19.

Summons to Oral Proceedings of EP 18185160.1 dtd Mar. 24, 2021.

Symonds et al., "Section 5 Strength of Materials 5.1 Mecahnical Properties of Materials, Expanded by Staff Strees-Strain Diagrams 5-13 5.2 Mechanics of Materials", Product Quality and Inspection Technology, Manufactuing Development, Jan. 1, 1996.

* cited by examiner

POSITIVE ELECTRODE FOR METAL-AIR BATTERY, METAL-AIR BATTERY INCLUDING THE SAME, AND METHOD OF MANUFACTURING CARBON NANOTUBE THIN FILM

CROSS-REFERENCE TO RELATED APPLICATION

This application claims priority to and the benefit of Korean Patent Application No. 10-2017-0094315, filed on Jul. 25, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a positive electrode for metal-air battery including a carbon nanotube thin film, a metal-air battery including the same, and a method of manufacturing the carbon nanotube thin film.

2. Description of the Related Art

A metal-air battery includes a negative electrode which adsorbs and desorbs ions and a positive electrode at which oxygen present in the air is used as an active material. Reduction and oxidation of oxygen from the outside occurs in the positive electrode, and the oxidation and reduction of a metal occurs in the negative electrode. Chemical energy generated from the reduction and oxidation reactions is extracted and converted to electrical energy. For example, the metal-air battery absorbs oxygen during discharge and emits oxygen during charge. As such, since the metal-air battery uses oxygen from in the air as an active material, the energy density of a battery may be much improved. For example, the metal-air battery may have an energy density which is several times greater than an energy density of a lithium-ion battery.

However, when oxygen is used as an active material in the positive electrode of a metal-air battery, lithium peroxide ($Li_2O_2$) may be generated as a discharge product. The lithium peroxide discharge product is an electrical insulator, and thus may prevent the flow of electrical energy. When a carbon film including porous carbon is used as the positive electrode for a metal-air battery, space for the generation of a discharge product is insufficient and thus there may be a problem in that an electrolyte in the positive electrode for the metal-air battery is discharged to the outside or a porous structure is clogged.

Accordingly, there remains a need for an improved positive electrode for a metal air battery.

SUMMARY

Provided is a method of manufacturing a carbon nanotube thin film in which the carbon nanotubes are aligned.

Provided is a metal-air battery in which the carbon nanotube thin film is included in the positive electrode.

According to an aspect of an embodiment, a positive electrode for a metal-air battery includes: a plurality of carbon nanotube films including a first carbon nanotube layer including a plurality of first carbon nanotubes, and a second carbon nanotube layer adjacent to the first carbon nanotube layer and including a plurality of second carbon nanotubes, wherein an alignment direction of the plurality of first carbon nanotubes in the first carbon nanotube layer and an alignment direction of the plurality of second carbon nanotubes in the second carbon nanotube layer are different from each other, and an average specific tensile strength of the plurality of carbon nanotube films is greater than or equal to about 0.1 gigapascal per gram per cubic centimeter $GPa/(g/cm^3)$ and less than or equal to about 1 $GPa/(g/cm^3)$.

The positive electrode for metal-air battery may further include an electrolyte film on a surface of each of the plurality of carbon nanotube films, and a space between each of the plurality of carbon nanotube films, wherein the space is configured such that the electrolyte film is pushed by a metal oxide generated during discharge of the metal-air battery, in a direction away from each of the plurality of carbon nanotube films.

An alignment angle of the plurality of first carbon nanotubes may have a deviation of about 15° to 45° in a clockwise or counterclockwise direction, and the Raman intensity ratio of a G band of the alignment direction of the plurality of first carbon nanotubes to a G band of a direction perpendicular to the alignment direction of the plurality of first carbon nanotubes may be greater than or equal to about 1.5 and less than or equal to about 4, and an alignment angle of the plurality of second carbon nanotubes may have a deviation of about 15° to about 45° in a clockwise or counterclockwise direction, and the Raman intensity ratio of a G band of the alignment direction of the plurality of second carbon nanotubes to a G band of a direction perpendicular to the alignment direction of the plurality of second carbon nanotubes may be greater than or equal to about 1.5 and less than or equal to about 4.

The first carbon nanotube layer and the second carbon nanotube layer may each have a flat plate shape, and wherein an angle between the alignment direction of the plurality of first carbon nanotubes and the alignment direction of the plurality of second carbon nanotubes may be greater than or equal to about 15° and less than or equal to about 90°.

An aspect ratio of the carbon nanotube may be greater than or equal to about $5\times10^4$ and less than or equal to about $1\times10^7$.

An average length of the plurality of first carbon nanotubes, the plurality of second carbon nanotubes, or a combination thereof may be greater than or equal to 50 micrometers (μm) and less than or equal to 1 centimeter (cm).

An average diameter of the plurality of first carbon nanotubes, the plurality of second carbon nanotubes, or a combination thereof may be greater than or equal to about 1 nanometer (nm) and less than or equal to about 50 nm.

A loading amount of the carbon nanotube in a carbon nanotube film may be greater than or equal to about 25 micrograms per square centimeter ($\mu g/cm^2$) and less than or equal to about 5 milligrams per square centimeter ($mg/cm^2$).

An average conductivity of the plurality of carbon nanotube films may be greater than or equal to about $5\times10^2$ Siemens per centimeter per grams per cubic centimeter $((S/cm)/(g/cm^3))$.

The carbon nanotube may include a single walled carbon nanotube (SWNT), a double-walled carbon nanotube (DWNT), a multi-walled carbon nanotube (MWNT), or a combination thereof.

According to another aspect of an embodiment, a metal-air battery includes a negative electrode metal layer, a positive electrode layer, and a gas diffusion layer configured to supply oxygen to the positive electrode layer, wherein the positive electrode layer includes: a plurality of carbon nanotube thin films including a first carbon nanotube layer including a plurality of first carbon nanotubes, and a second carbon nanotube layer adjacent to the first carbon nanotube layer and including a plurality of second carbon nanotubes, wherein an alignment direction of the plurality of first carbon nanotubes in the first carbon nanotube layer and an alignment direction of the plurality of second carbon nanotubes in the second carbon nanotube layer are different from each other, and an average specific tensile strength of the plurality of carbon nanotube films may be greater than or equal to 0.1 GPa/(g/cm$^3$) and less than or equal to 1 GPa/(g/cm$^3$).

The metal-air battery may further include an electrolyte film disposed on a surface of each of the plurality of carbon nanotube films, and a space between each of the plurality of carbon nanotube films, wherein the space is configured such that the electrolyte film is pushed by a metal oxide generated during discharge of the metal-air battery, in a direction away from each of the plurality of carbon nanotube films.

An alignment angle of the plurality of first carbon nanotubes may have a deviation of about 15° to about 45° in a clockwise or counterclockwise direction, and the Raman intensity ratio of a G band (of the alignment direction of the plurality of first carbon nanotubes to a G band of a direction perpendicular to the alignment direction of the plurality of first carbon nanotubes may be greater than or equal to about 1.5 and less than or equal to about 4, and an alignment angle of the plurality of second carbon nanotubes may have a deviation of about 15° to 45° in a clockwise or counterclockwise direction, and the Raman intensity ratio of a G band of the alignment direction of the plurality of second carbon nanotubes to a G band of a direction perpendicular to the alignment direction of the plurality of first carbon nanotubes may be greater than or equal to about 1.5 and less than or equal to about 4.

The first carbon nanotube layer and the second carbon nanotube layer may each have a flat plate shape, and the plurality of carbon nanotubes in the first carbon nanotube layer and the plurality of carbon nanotubes in the second carbon nanotube layer may be disposed at an angle of greater than or equal to 15° and less than or equal to 90°.

An aspect ratio of a carbon nanotube may be greater than or equal to about $5 \times 10^4$ and less than or equal to about $1 \times 10^7$.

An average length of the plurality of first carbon nanotubes, the plurality of second carbon nanotubes, or a combination thereof in an extension direction of the plurality of carbon nanotubes may be greater than or equal to about 50 µm and less than or equal to about 1 cm.

An average diameter of the plurality of first carbon nanotubes, the plurality of second carbon nanotubes, or a combination thereof may be greater than or equal to about 1 nm and less than or equal to about 50 nm.

A total amount of a carbon nanotube in a carbon nanotube film may be greater than or equal to about 25 micrograms per square centimeter (µg/cm$^2$) and less than or equal to about 5 mg/cm$^2$.

An average conductivity of the plurality of carbon thin films may be greater than or equal to about $5 \times 10^2$ (S/cm)/(g/cm$^3$).

The carbon nanotube may include a single walled carbon nanotube (SWNT), a double-walled carbon nanotube (DWNT), a multi-walled carbon nanotube (MWNT), or a combination thereof.

According to another aspect of an embodiment, a method of manufacturing a carbon nanotube thin film includes supplying a carbon nanotube precursor and a catalyst precursor to an inside of a reaction chamber, generating catalyst particles by pyrolyzing the catalyst precursor in the reaction chamber, forming a plurality of carbon nanotubes by pyrolyzing the carbon nanotube precursor in the reaction chamber, and attaching the plurality of carbon nanotubes at a speed of greater than or equal to 1 meter per minute (m/min) and less than or equal to 20 m/min on a surface of a roller portion rotating around an axis.

Each of the plurality of carbon nanotubes may be aligned in a direction perpendicular to an extension direction of the plurality of carbon nanotubes, the alignment angle of the plurality of carbon nanotubes may have a deviation of about 15° to 45° in a clockwise or counterclockwise direction, and a Raman intensity ratio of a G band of an alignment direction of the plurality of carbon nanotubes to a G band of a direction perpendicular to the alignment direction of the plurality of carbon nanotubes may be greater than or equal to about 1.5 and less than or equal to about 4.

The roller portion may repeatedly rotate two or more times at a same location, forming a plurality of carbon nanotube thin films.

Each first carbon nanotube of a plurality of first carbon nanotubes forming a first carbon nanotube layer may be aligned in a direction perpendicular to an extension direction of the plurality of first carbon nanotubes, each second carbon nanotube of a plurality of second carbon nanotubes forming a second carbon nanotube layer may be aligned in a direction perpendicular to an extension direction of the plurality of second carbon nanotubes, and an alignment direction along a direction perpendicular to the extension direction of the plurality of first carbon nanotubes and an alignment direction along a direction perpendicular to the extension direction of the plurality of second carbon nanotubes may be identical to each other.

The roller portion may simultaneously perform a rotational motion and a translational motion moving along the axis.

The roller portion may repeatedly rotate around the axis two or more times at a same location, forming a plurality of carbon nanotube thin films.

Each first carbon nanotube of a plurality of first carbon nanotubes forming a first carbon nanotube layer may be aligned in a direction perpendicular to an extension direction of the plurality of first carbon nanotubes, each of a plurality of second carbon nanotubes included in a second carbon nanotube layer may be aligned in a direction perpendicular to an extension direction of the plurality of second carbon nanotubes, and an alignment direction along a direction perpendicular to the extension direction of the plurality of first carbon nanotubes and an alignment direction along a direction perpendicular to the extension direction of the plurality of second carbon nanotubes may be different from each other.

BRIEF DESCRIPTION OF THE DRAWINGS

These and/or other aspects will become apparent and more readily appreciated from the following description of the embodiments, taken in conjunction with the accompanying drawings in which.

Figure 4A:
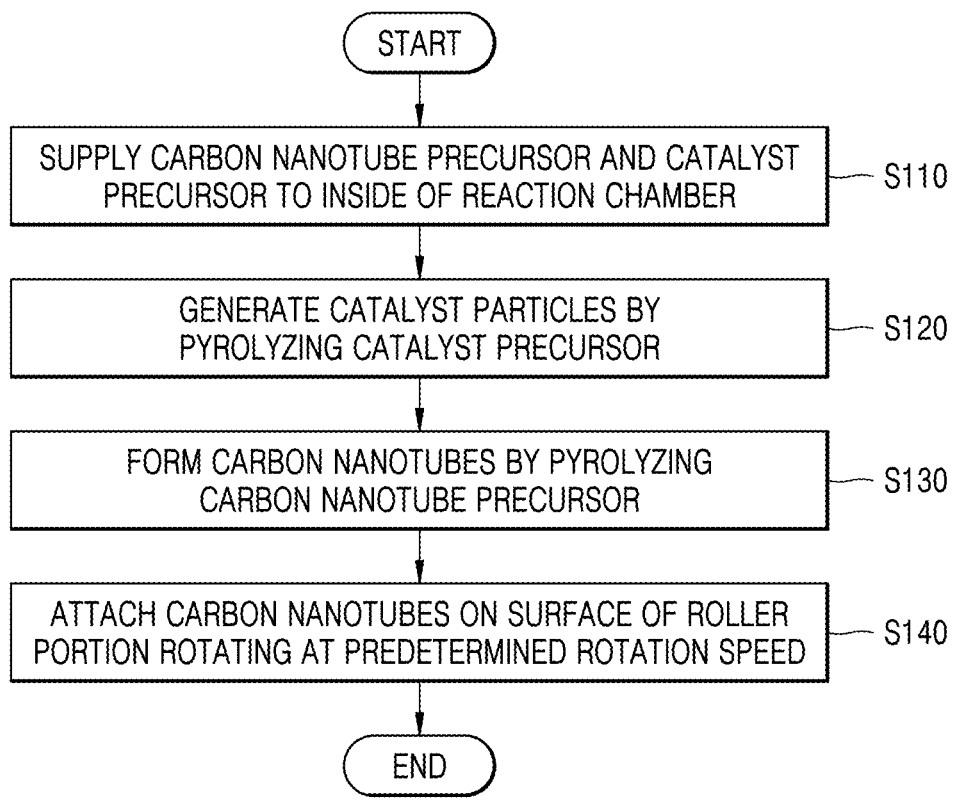
Figure 4B:
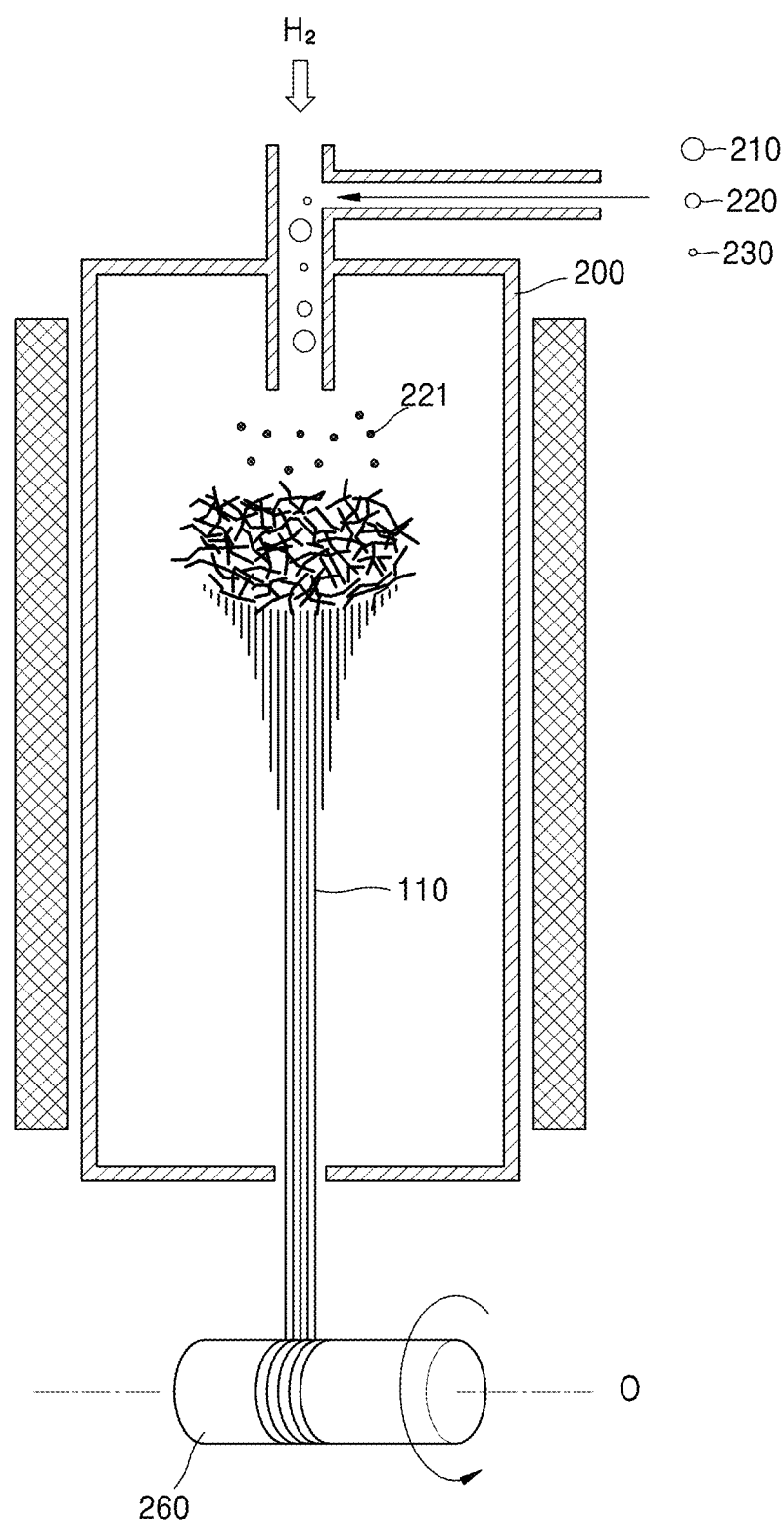
Figure 5A:
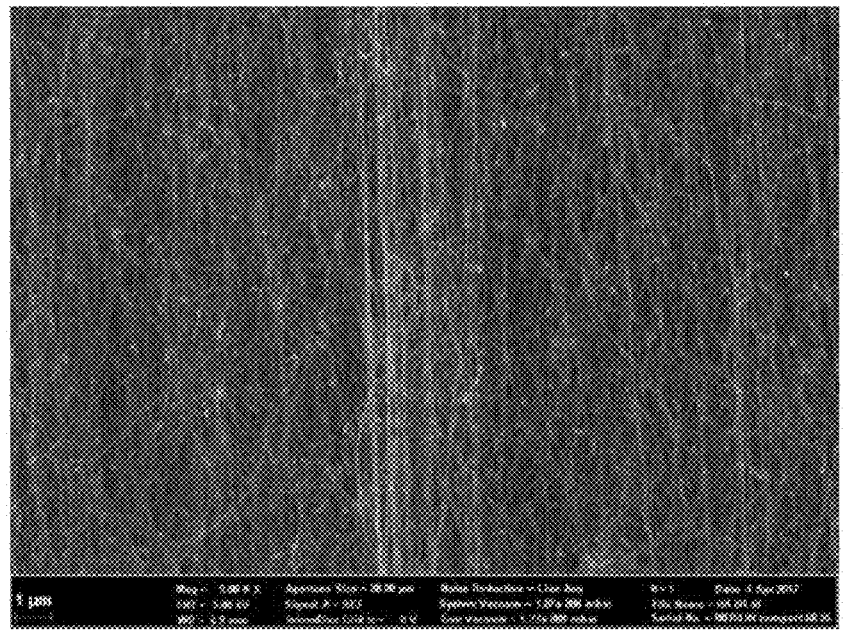
Figure 5B:
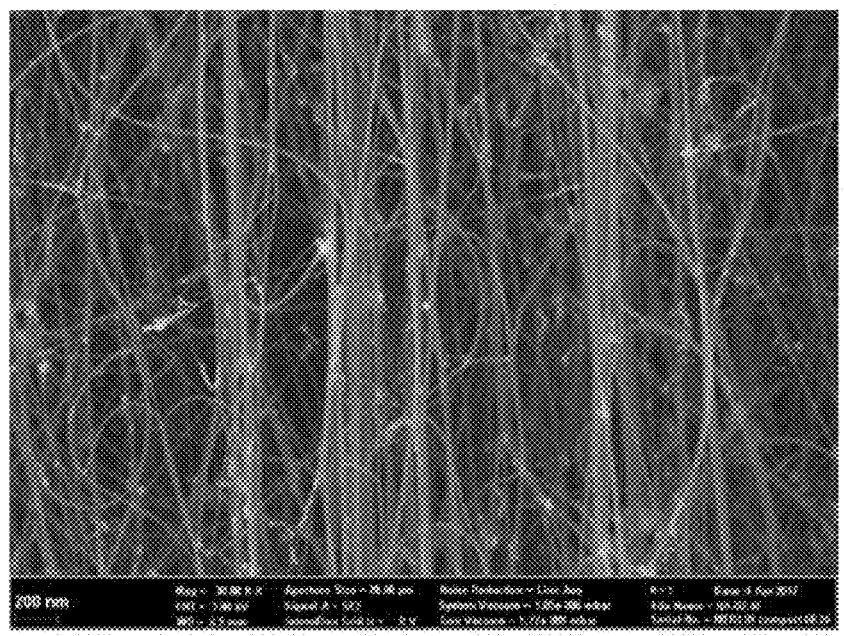
Figure 5C:
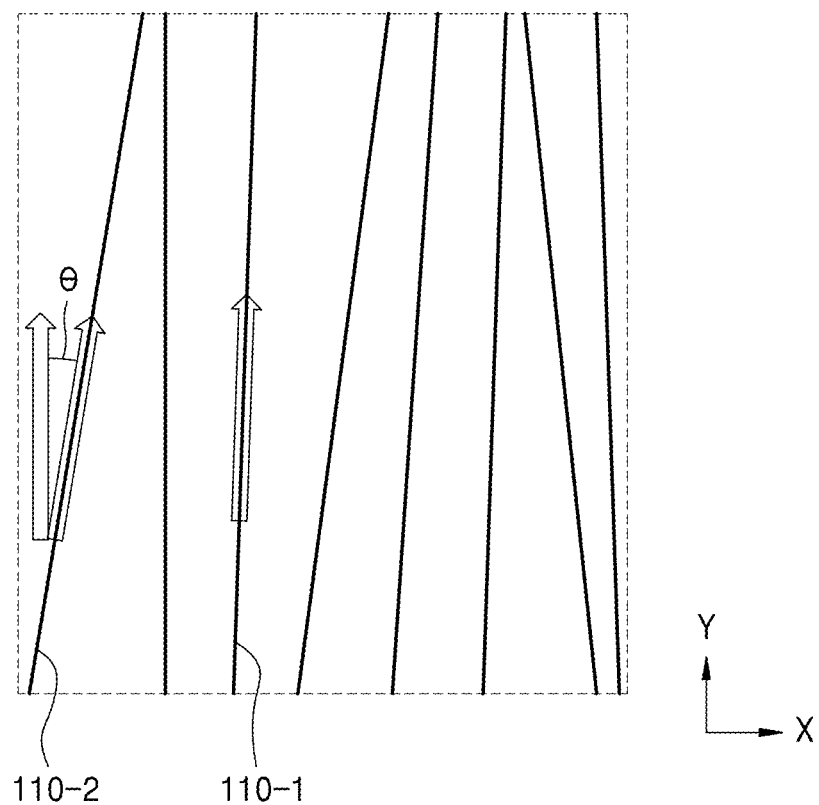
Figure 5D:
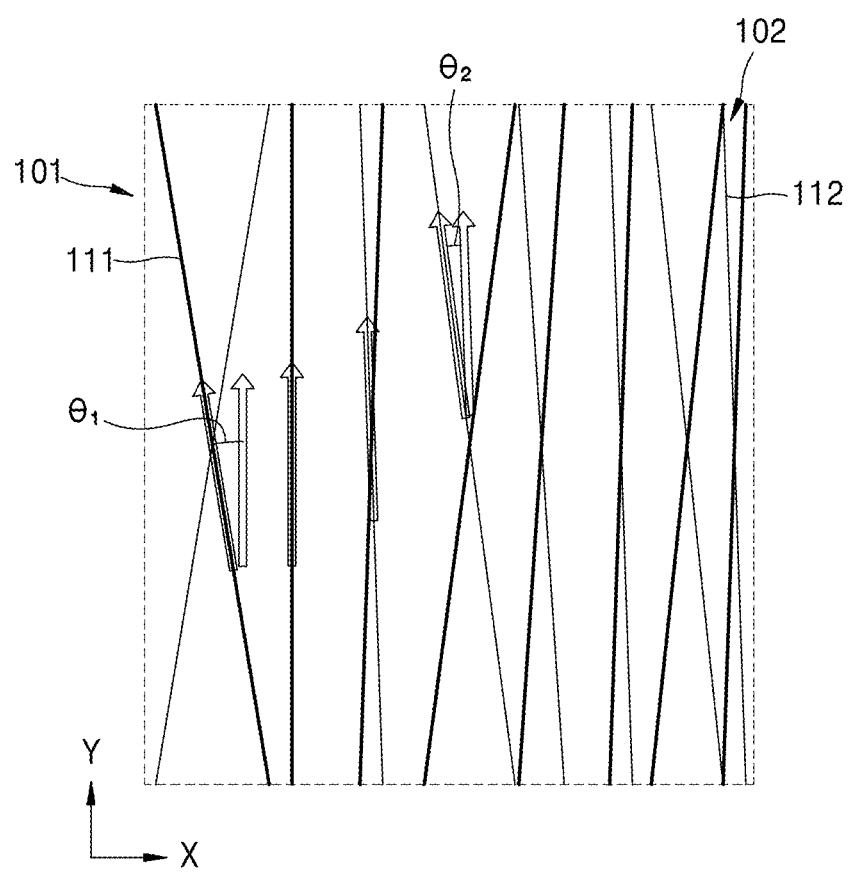
Figure 6A:
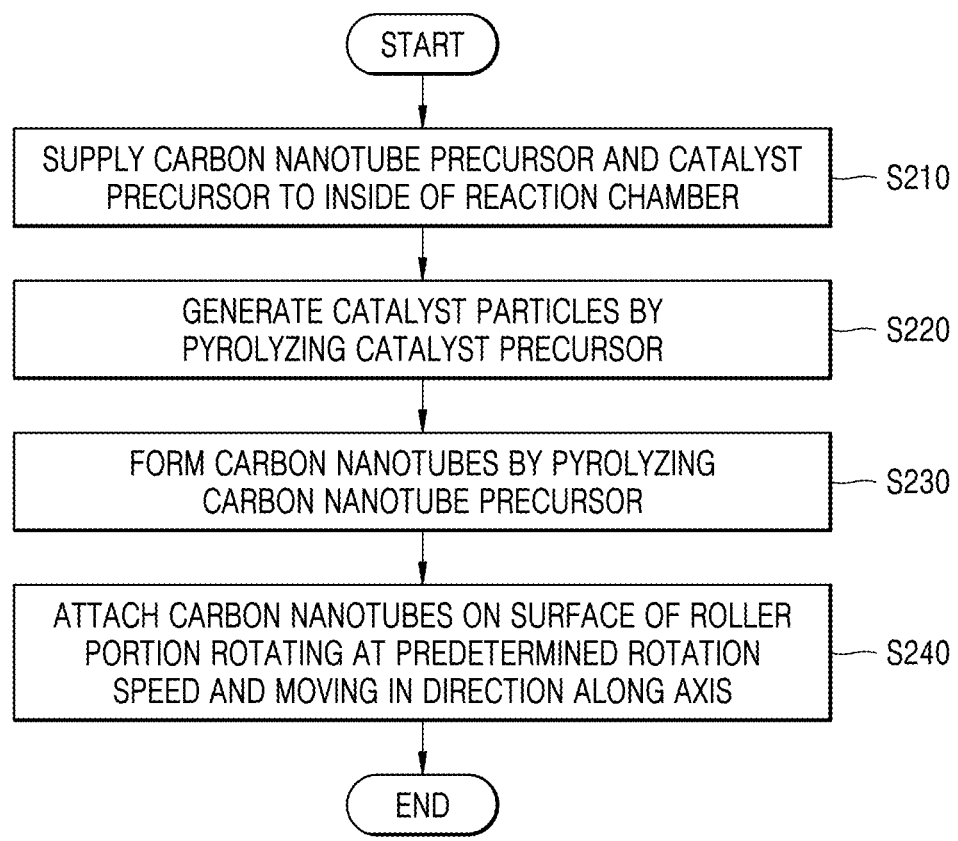
Figure 6B:
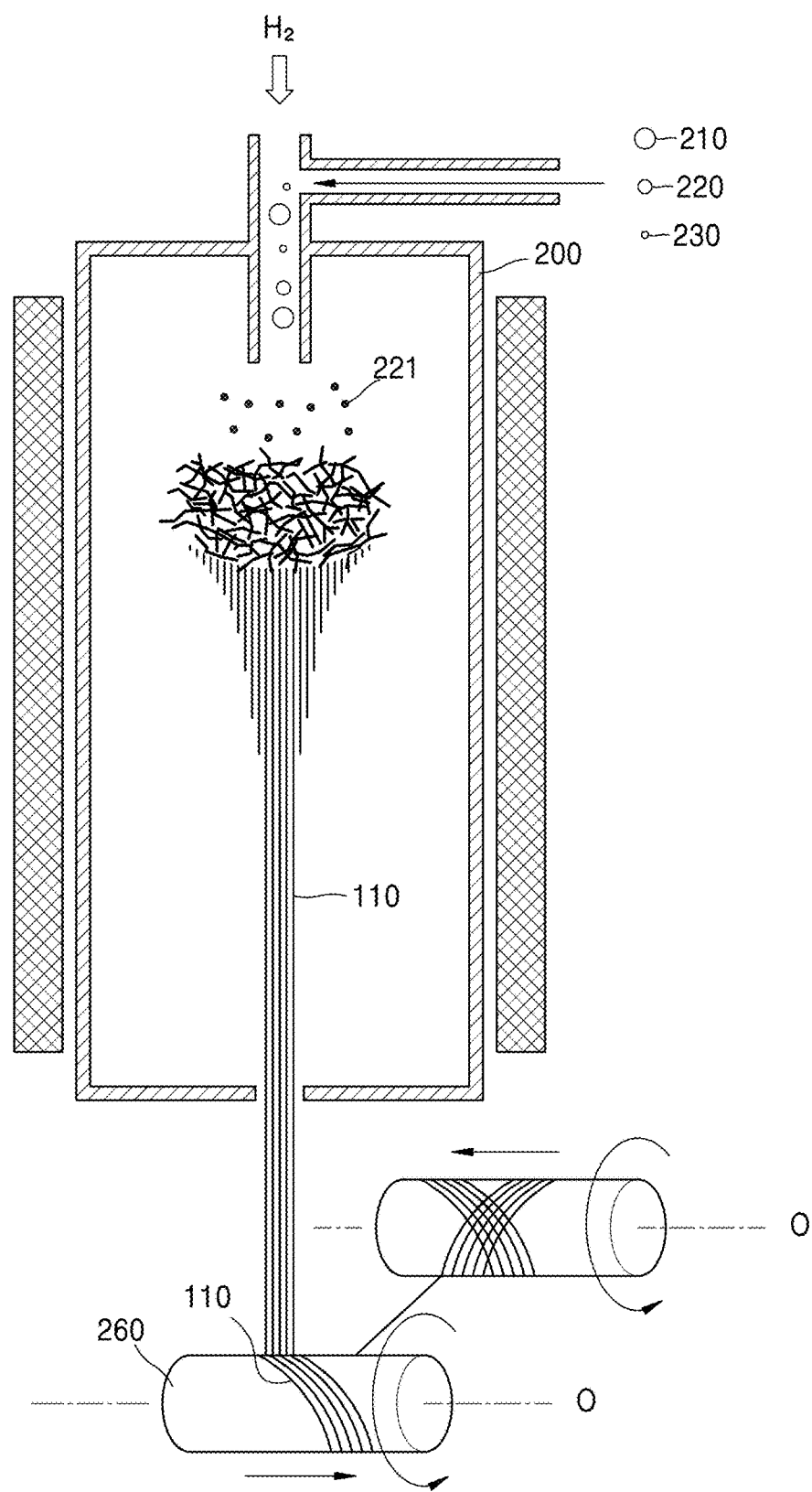
Figure 7A:
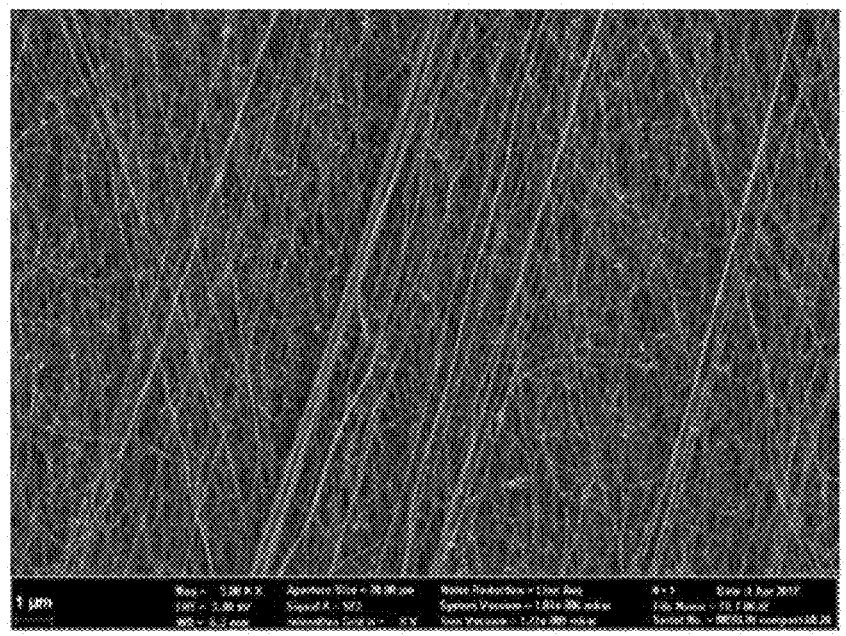
Figure 7B:
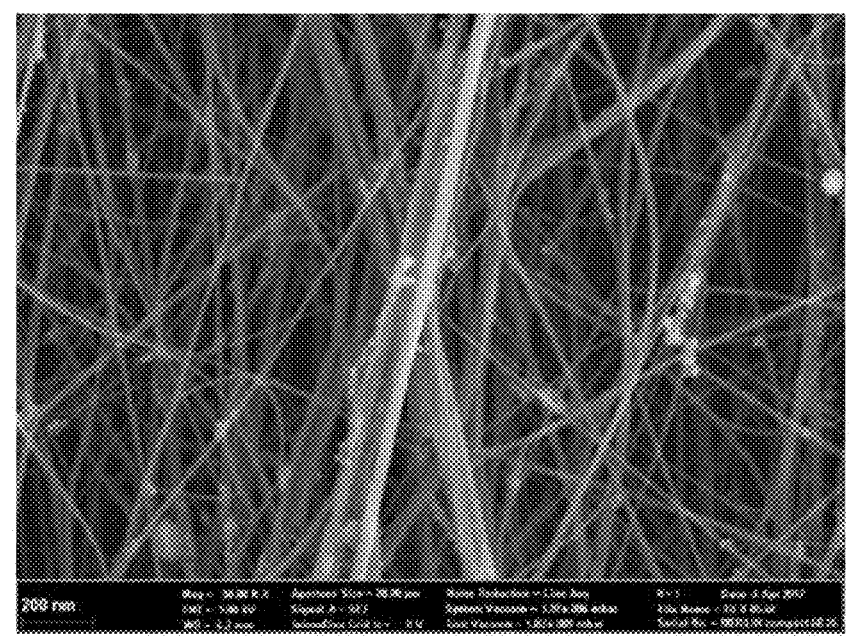
Figure 7C:
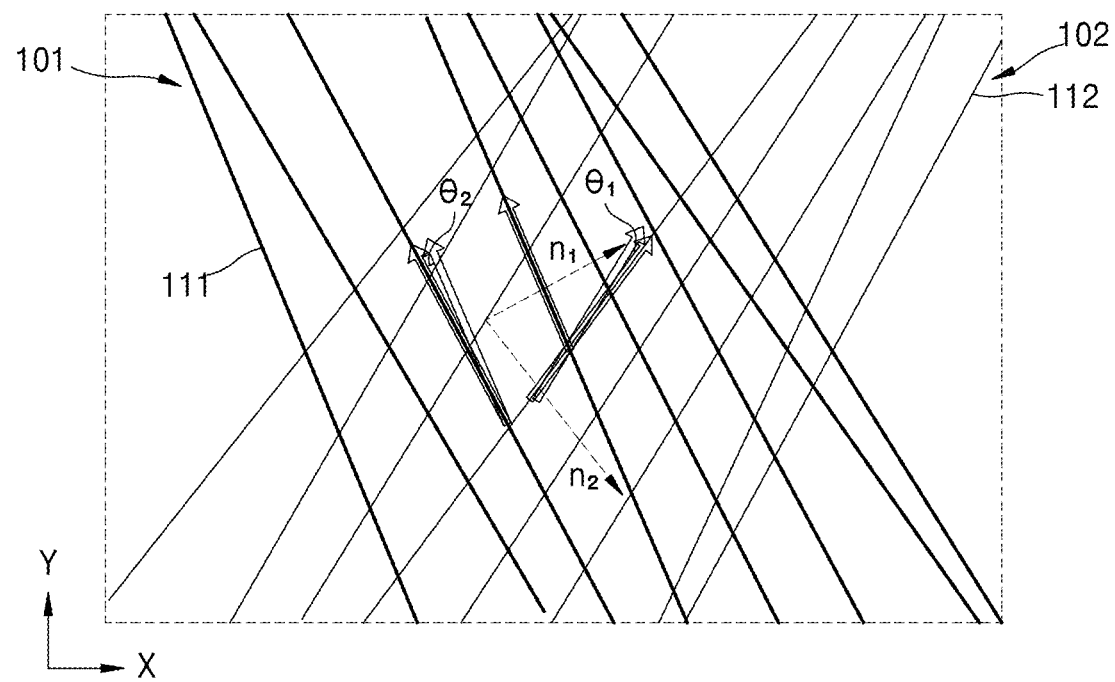
Figure 8A:
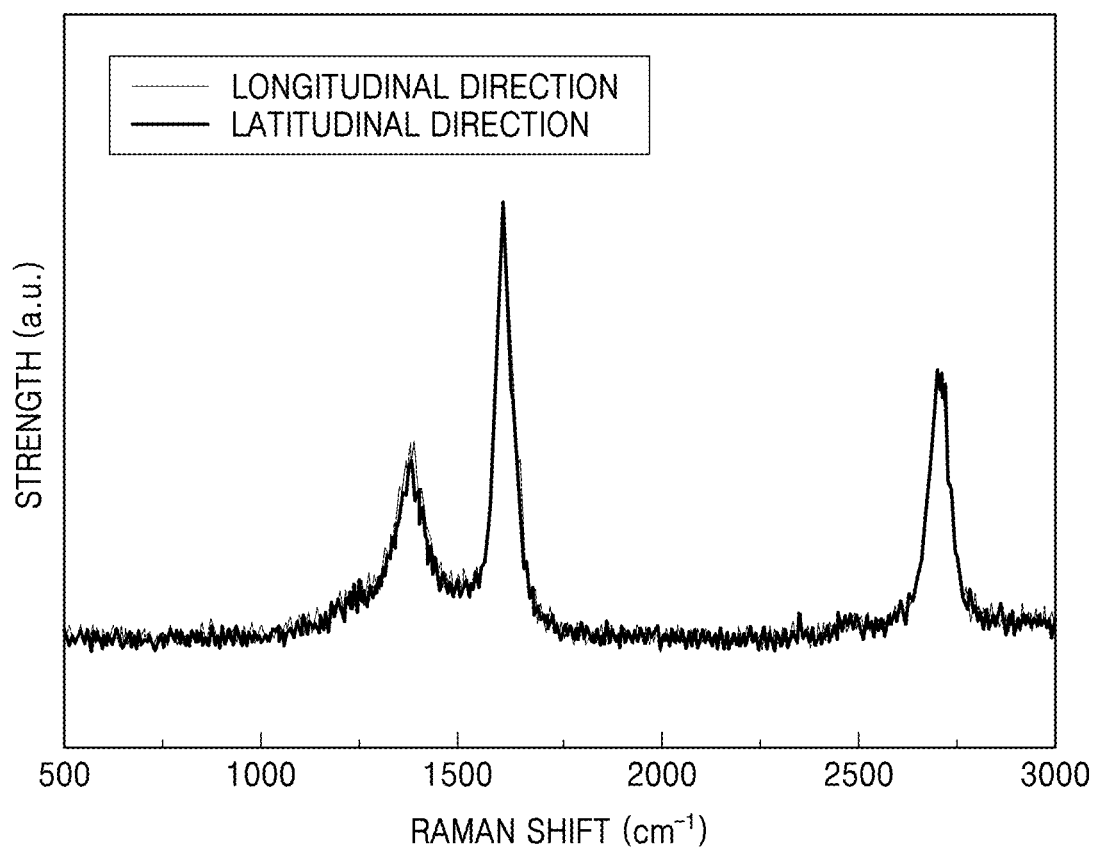
Figure 8B:
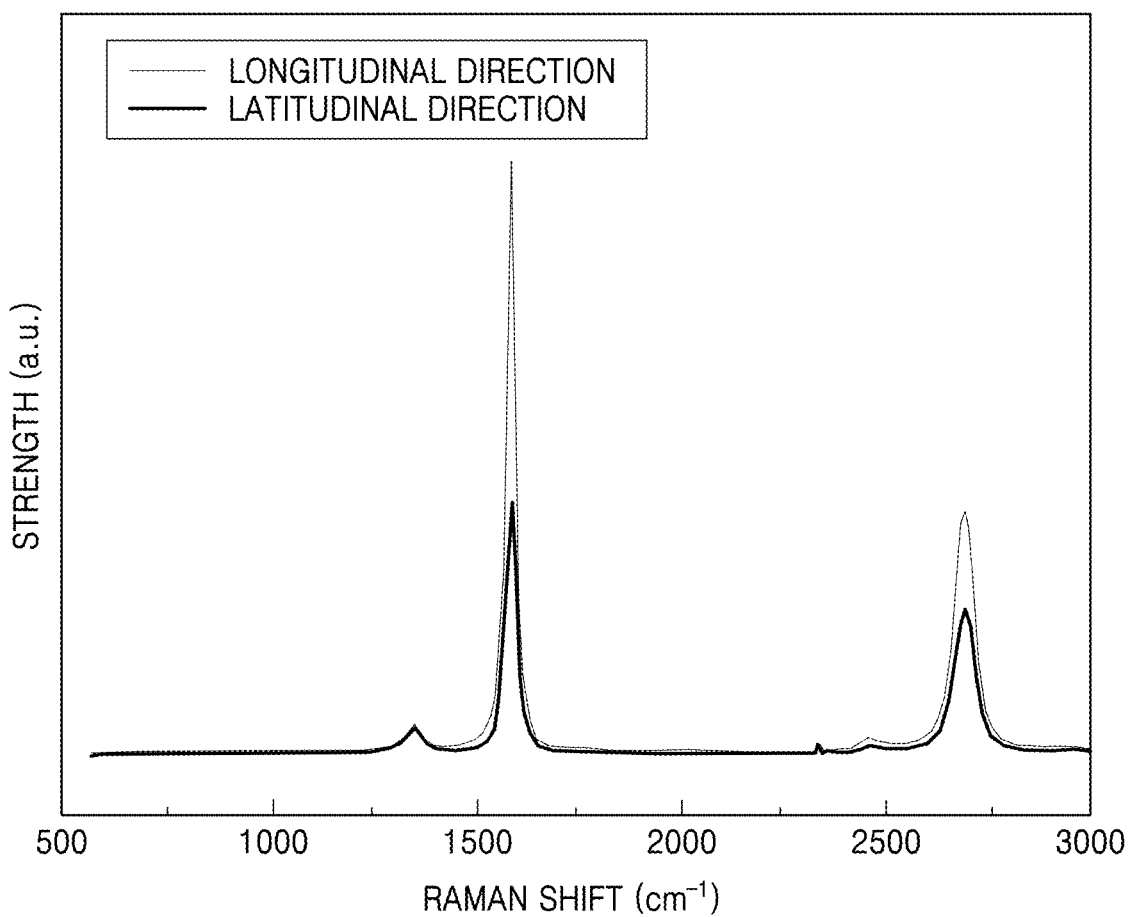
Figure 8C:
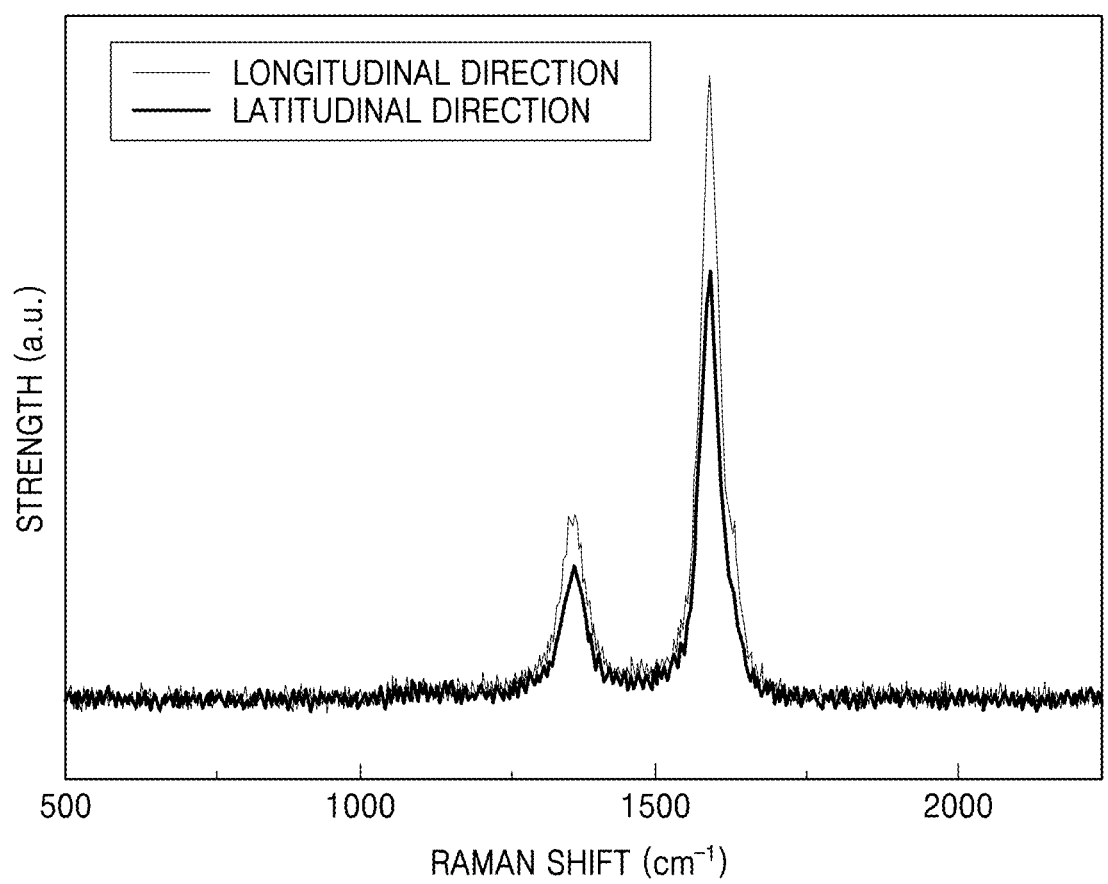
Figure 9:
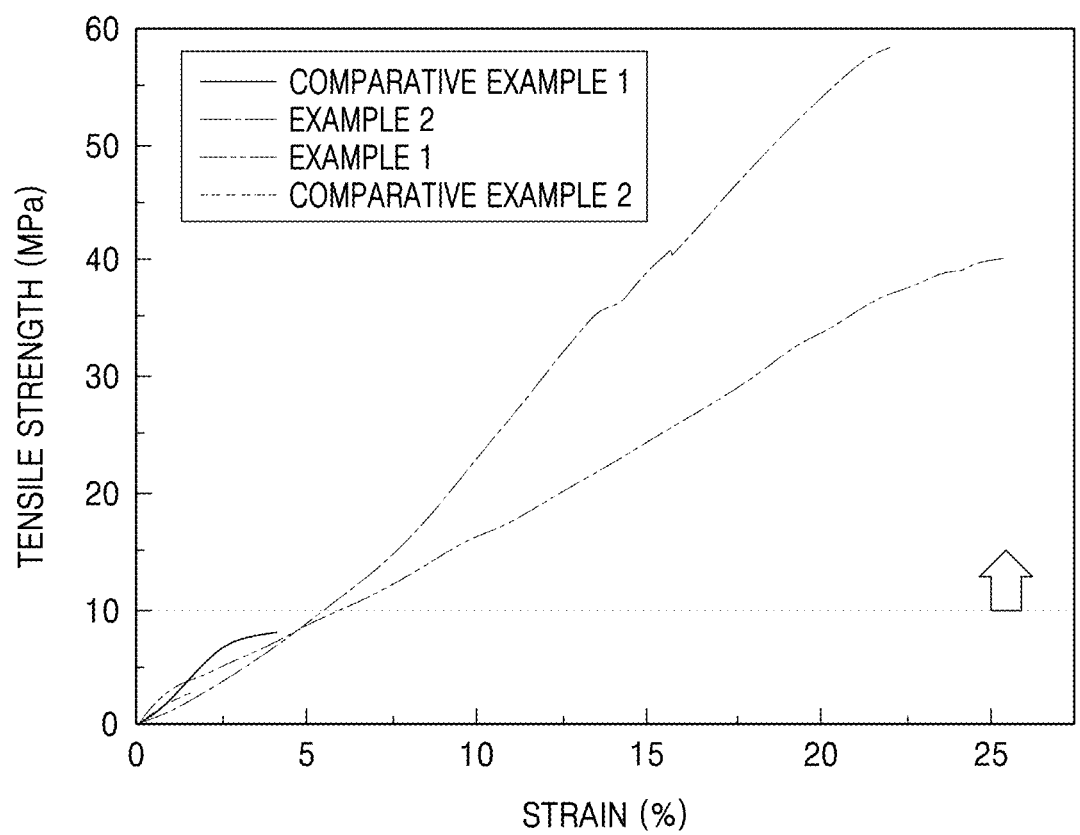
Figure 10A:
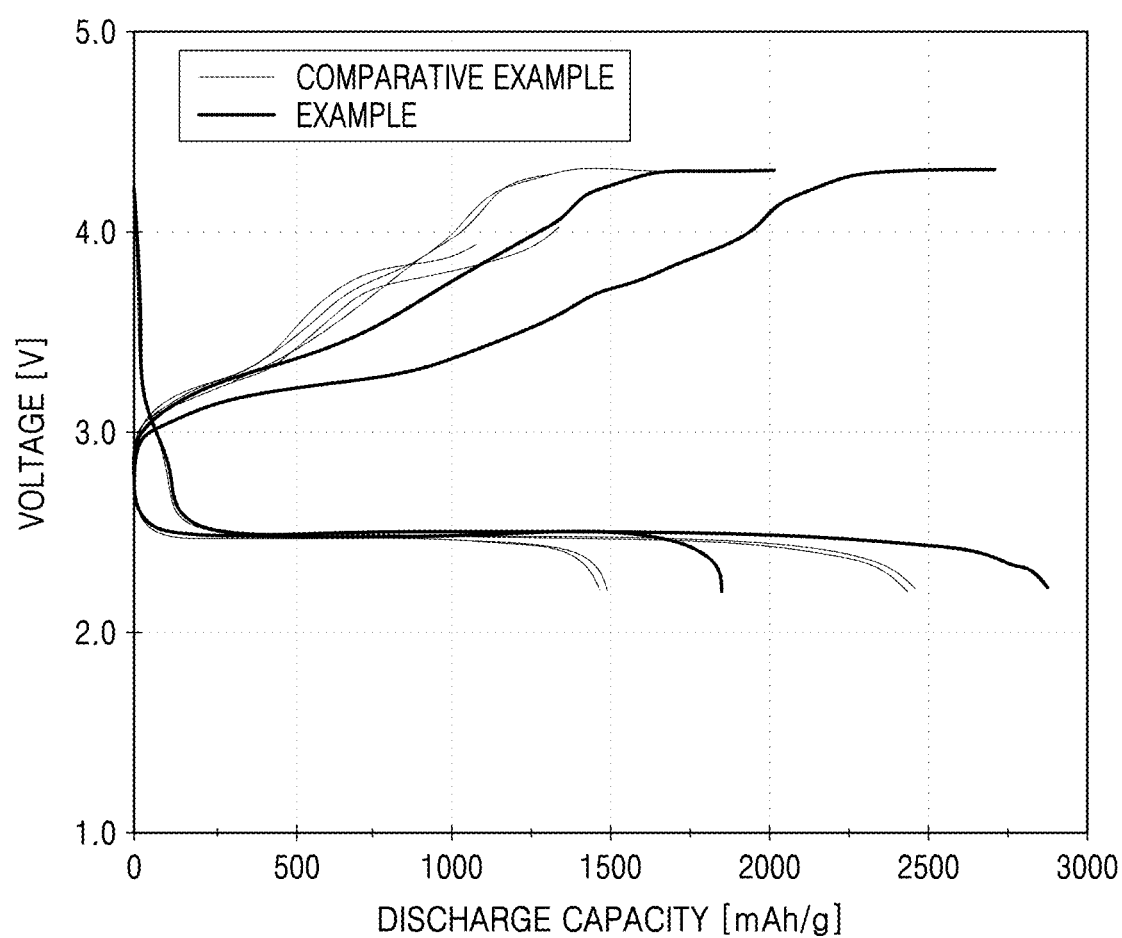
Figure 10B:
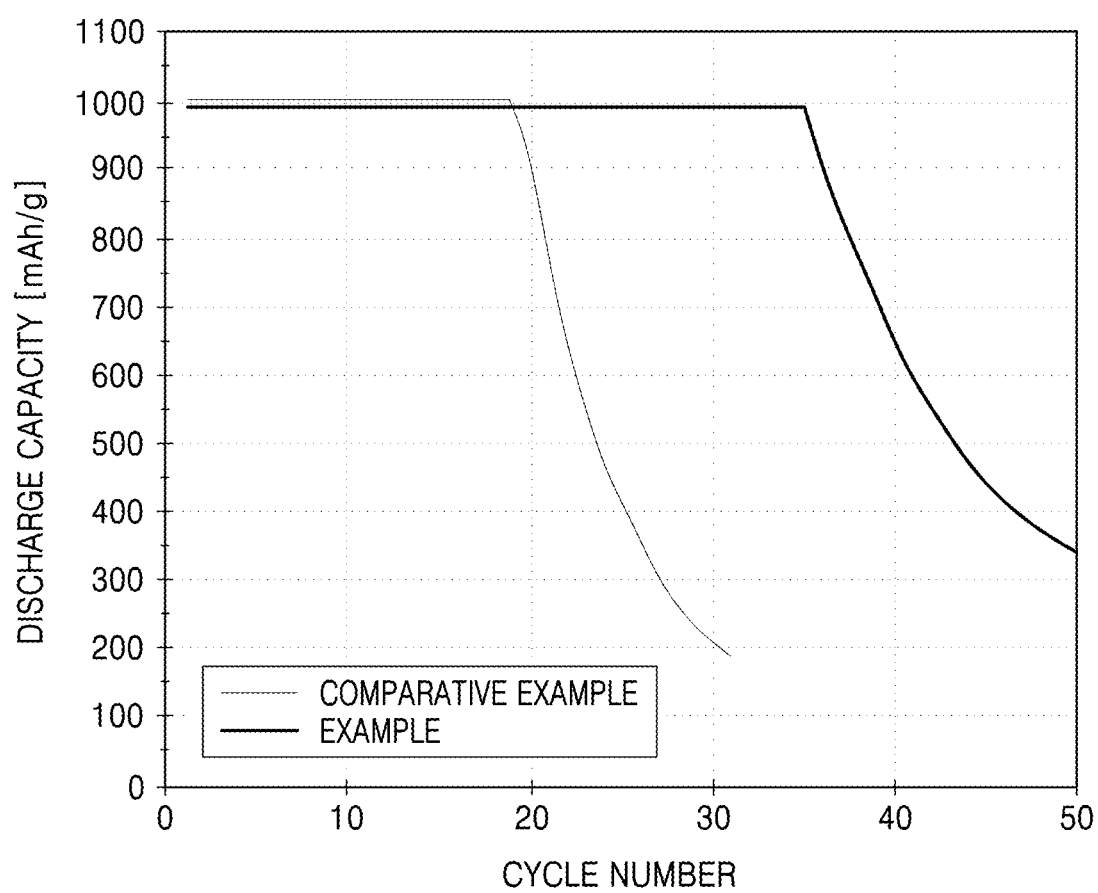
Figure 11:
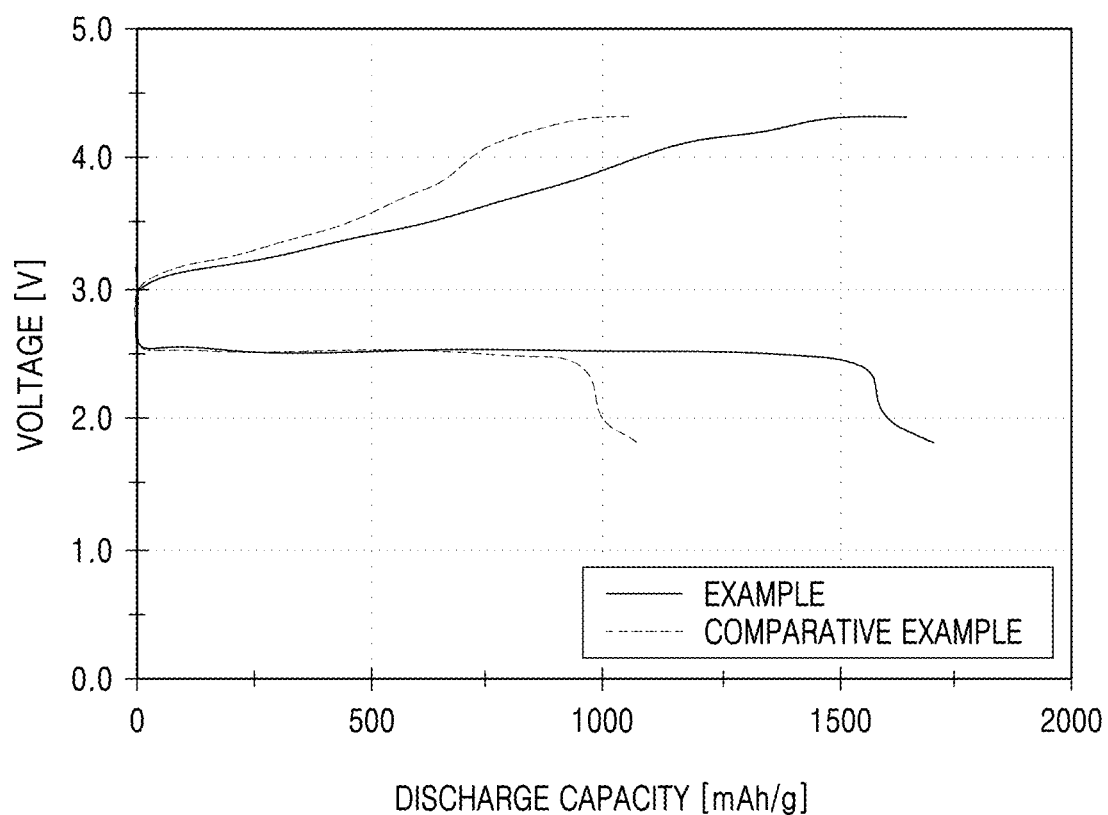
Figure 12A:
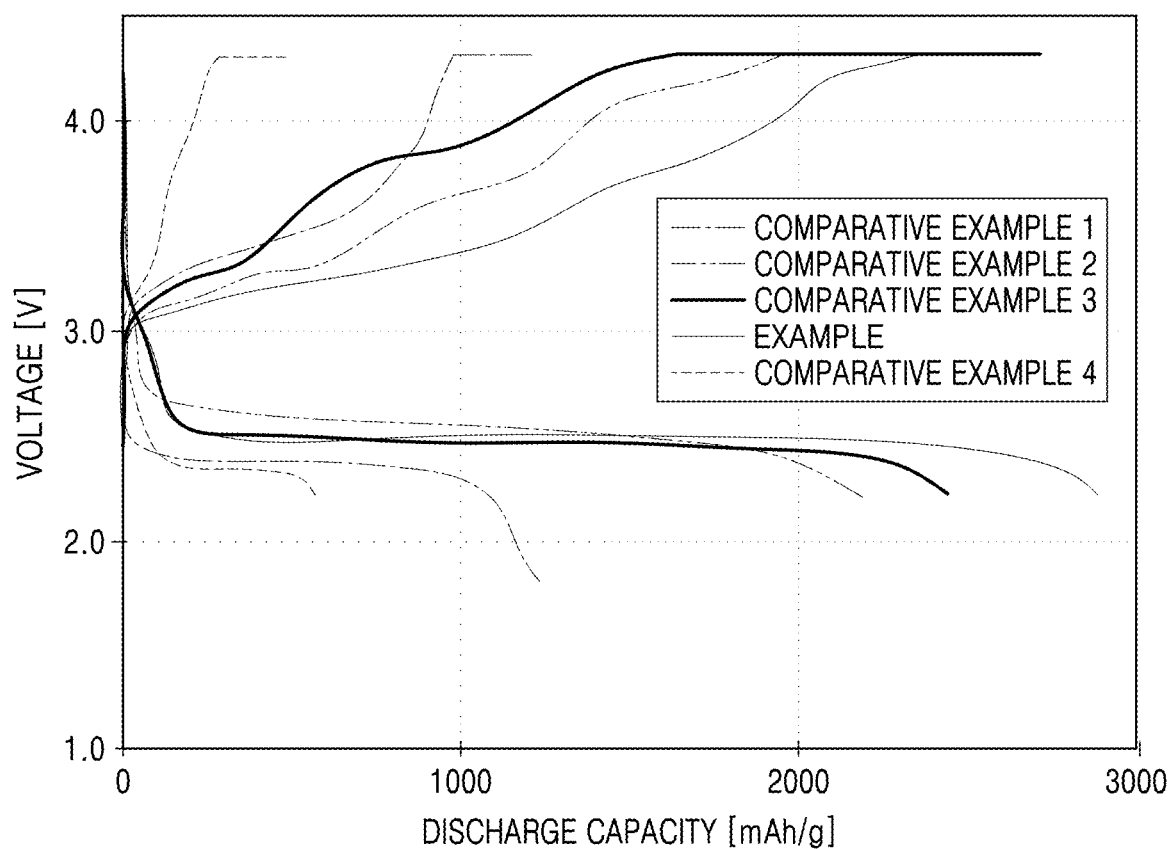
Figure 12B:
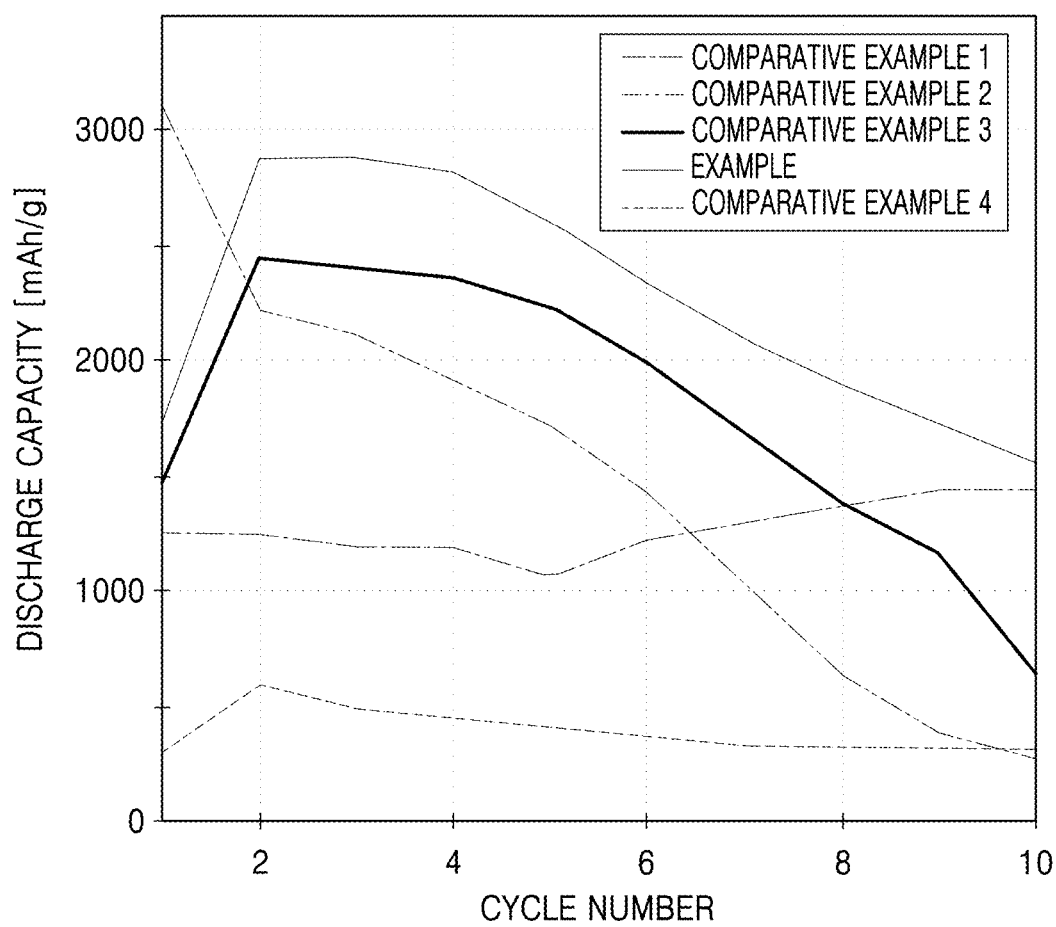

2 and a corresponding change in the position of an electrolyte film due to the metal oxide;

FIG. 4A is a flowchart of a method of manufacturing a carbon nanotube film according to an embodiment;

FIG. 4B is a schematic cross-sectional view of a method of manufacturing a carbon nanotube film according to an embodiment;

FIG. 5A is a scanning electron microscope (SEM) image of a carbon nanotube film formed by the method of FIG. 4A;

FIG. 5B is a magnified SEM image of the carbon nanotube film of FIG. 5A;

FIG. 5C is a schematic view of a single carbon nanotube film in FIG. 5B;

FIG. 5D is a schematic view of the carbon nanotube films in FIG. 5B;

FIG. 6A is a flowchart of a method of manufacturing a carbon nanotube film according to another embodiment;

FIG. 6B is a schematic cross-sectional view of a method of manufacturing a carbon nanotube film according to another embodiment;

FIG. 7A is a SEM image of a carbon nanotube film formed by the method of FIG. 6A;

FIG. 7B is a magnified SEM image of the carbon nanotube film of FIG. 7A;

FIG. 7C is a schematic view of carbon nanotube films of FIG. 7A;

FIGS. 8A to 8C are graphs of signal strength (arbitrary units, a.u.) versus Raman shift (per centimeter, $cm^{-1}$) showing the results of a polarized Raman spectra of Comparative Example 1, Comparative Example 2, and Example 1, respectively;

FIG. 9 is a graph of tensile strength (millipascals, MPa) versus strain (percent, %) showing changes in the tensile strength of the carbon nanotube thin films according to Comparative Example 1, Comparative Example 2, Example 1, and Example 2;

FIG. 10A is a graph of voltage (volts, V) versus discharge capacity (milliampere hours per gram, mAh/g) showing a result of the measurement of an average voltage (V) and a discharge capacity (mAh/g) obtained in a discharge process, according to a comparative example and an embodiment; and FIG. 10B is a graph of discharge capacity (mAh/g) versus cycle number, showing a result of the measurement of a change of the discharge capacity (mAh/g) as a charge/discharge cycle is repeatedly performed, according to a comparative example and an embodiment;

FIG. 11 is a graph of voltage (V) versus discharge capacity (mAh/g) showing a result of the measurement of the average voltage (V) and the discharge capacity (mAh/g) obtained in a discharge process, according to a comparative example and an embodiment; and FIG. 12A is a graph of voltage (V) versus discharge capacity (mAh/g showing a result of the measurement of the average voltage (V) and the discharge capacity (mAh/g) obtained in a discharge process, according to a comparative example and an embodiment; and FIG. 12B is a graph of discharge capacity (mAh/g) versus cycle number showing a result of the measurement of a change of the discharge capacity (mAh/g) as a charge/discharge cycle is repeatedly performed, according to a comparative example and an embodiment.

DETAILED DESCRIPTION

Reference will now be made in detail to embodiments, examples of which are illustrated in the accompanying drawings, wherein like reference numerals refer to like elements throughout. This invention may, however, be embodied in many different forms, and should not be construed as limited to the embodiments set forth herein.

Also, the size of each layer illustrated in the drawings may be exaggerated for convenience of explanation and clarity. In this regard, the present embodiments may have different forms and should not be construed as being limited to the descriptions set forth herein. Accordingly, the embodiments are merely described below, by referring to the figures, to explain aspects of the present description. In a layer structure, when a constituent element is disposed "above" or "on" to another constituent element, the constituent element may be only directly on the other constituent element or above the other constituent elements in a non-contact manner. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a metal-air battery including a positive electrode having a structure including a space for accommodating a metal oxide generated during a discharge operation of the metal-air battery.

Figure 1:
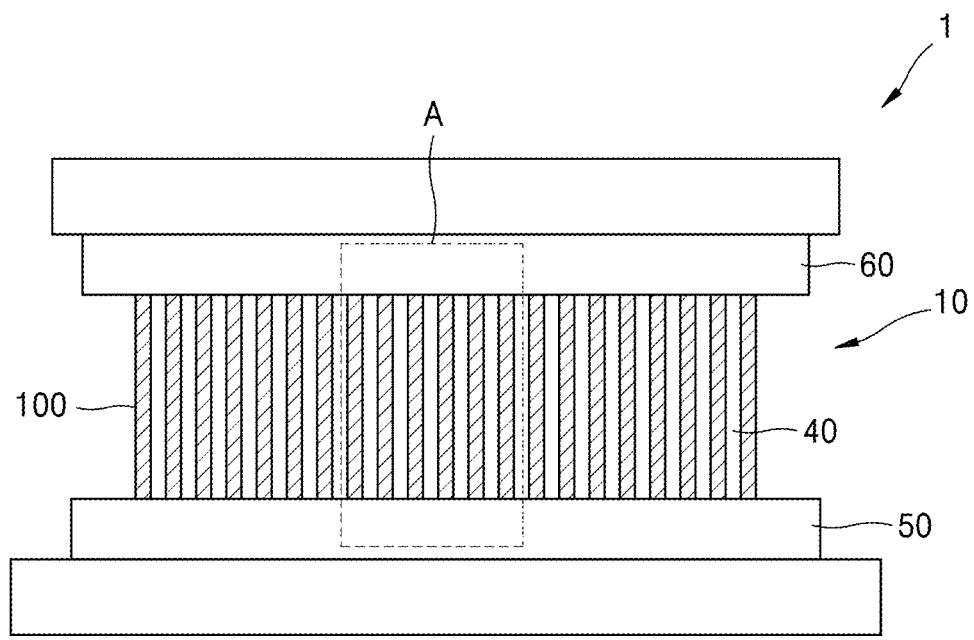
FIG. 1 is a schematic cross-sectional view of a structure of a metal-air battery according to an embodiment.
Figure 2:
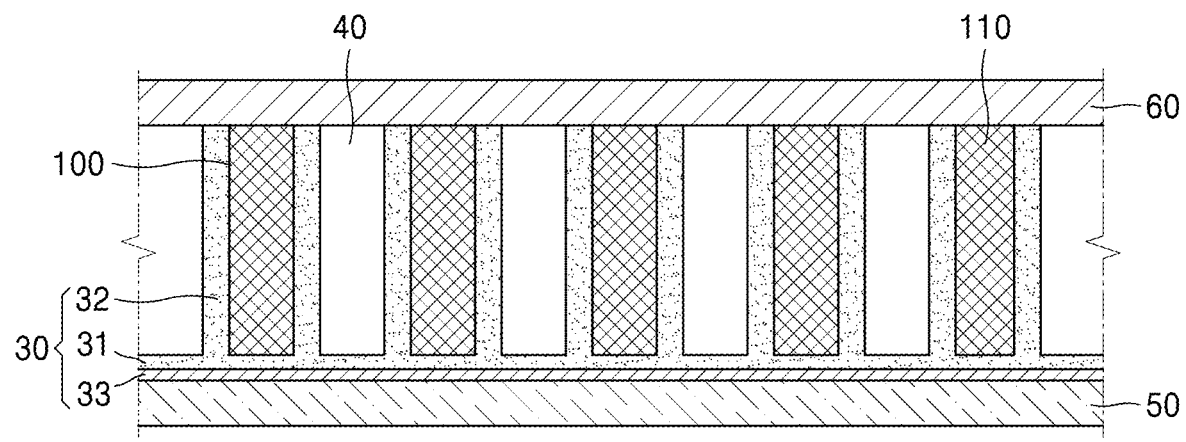
FIG. 2 is an enlarged view of a portion A in the metal-air battery of FIG. 1.
Figure 3:
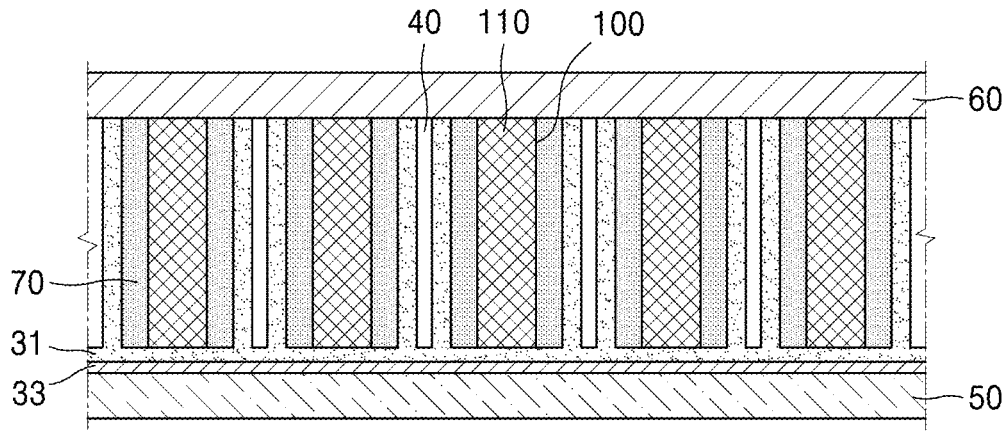
FIG. 3 is a cross-sectional view illustrating a metal oxide generated during discharge of the metal-air battery of FIG.

FIG. 1 is a schematic cross-sectional view of a structure of a metal-air battery 1 according to an embodiment. FIG. 2 is an enlarged view of a portion A of the metal-air battery 1 of FIG. 1. FIG. 3 is a cross-sectional view illustrating a metal oxide generated during discharge of the metal-air battery 1 of FIG. 2 and a corresponding change in the position of an electrolyte film due to the metal oxide.

Referring to FIGS. 1 and 2, the metal-air battery 1 according to the present embodiment uses oxygen as an active material, and includes a positive electrode layer 10. The positive electrode layer includes one or more carbon nanotube film 100, each including a plurality of carbon nanotubes 110, an electrolyte film 30 arranged on a surface of each of the carbon nanotube thin films 100, and space 40 encompassed by the carbon nanotubes 110 and the electrolyte film 30. In an embodiment, the positive electrode includes a plurality of carbon nanotube films 100. The metal-air battery 1 may further include a negative electrode layer 50 facing a first end portion of the positive electrode layer 10 and a gas diffusion layer 60 facing a second end portion of the positive electrode layer 10 and configured to supply oxygen to the positive electrode 10 for metal-air battery.

The positive electrode layer 10 may be formed of a carbon based (carbon containing) material or at least one of various conductive materials. For example, the positive electrode layer 10 may include carbon black, graphite, graphene, activated carbon, carbon fiber, carbon nanotube, or a combination thereof. In an embodiment, the positive electrode 10 for metal-air battery may include the one or more carbon nanotube film 100 including the plurality of carbon nanotubes 110. Detailed descriptions related to the positive electrode layer 10 are presented below.

The electrolyte film 30 serves to transmit metal ions to the carbon nanotube film 100. To this end, the electrolyte film 30 may include an electrolyte obtained by dissolving a metal salt(s) in a solvent. The electrolyte may be manufactured to have a flexible solid phase, and may include a polymer based electrolyte, an inorganic based electrolyte, or a composite electrolyte thereof, and is easily bendable. For example, a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or lithium bis(trifluoromethanesulfonyl)imide (LiTFSI), or a combination thereof, may be used as the metal salts. A metal salt such as $AlCl_3$, $MgCl_2$, $NaCl$, $KCl$, $NaBr$, $KBr$, $CaCl_2$, or a combination thereof may be further added to the above-described lithium salt. Any material capable of dissolving the lithium salt and the metal salt may be used as the solvent.

The electrolyte film 30 may further include a separation film (not shown) having conductivity with respect to metal ions and preventing permeation of oxygen. A bendable polymer-based (polymer-containing) separation film may be used as the separation film. For example, a polymeric nonwoven fabric, such as a nonwoven fabric made of a polypropylene material or a nonwoven fabric made of a polyphenylene sulfide material, a porous film made of an olefin based resin such as polyethylene or polypropylene, or a combination thereof, may be used as the separation film. The separation film and the electrolyte film 30 may be formed as separate layers, or alternatively, the electrolyte film 30 may be formed as a single layer by adding the electrolyte within pores of a porous separation film by dipping the porous separation film in an electrolyte.

The negative electrode layer 50 serves to adsorb/desorb metal ions, and may include, for example, lithium (Li), sodium (Na), zinc (Zn), potassium (K), calcium (Ca), magnesium (Mg), iron (Fe), aluminum (Al), an alloy thereof, or a combination thereof.

The gas diffusion layer 60 serves to absorb oxygen present in the air and to provide the oxygen to the positive electrode 10. To this end, the gas diffusion layer 60 may have a porous structure to smoothly diffuse the external oxygen. For example, the gas diffusion layer 60 may be include a carbon fabric such as a carbon paper, a carbon cloth, or a carbon felt, or may include a sponge type material such as a foaming metal or a metal fiber mat. Furthermore, the gas diffusion layer 60 may include a non-conductive flexible porous material, such as a nonwoven fabric. The positive electrode 10 for metal-air battery may be manufactured to have pores in order to serve as a gas diffusion layer. In this case, the gas diffusion layer 60 may be omitted.

The electrolyte film 30 according to an embodiment, as illustrated in FIG. 2, may include a first electrolyte film 31 disposed above an upper surface of the negative electrode metal layer 50, a second electrolyte film 32 extending from the first electrolyte film 31 to the gas diffusion layer 60 and on a surface of the carbon nanotube film 100, and a third electrolyte film 33 interposed between the negative electrode layer 50 and the first electrolyte film 31. The third electrolyte film 33 may serve to facilitate the diffusion of metal ions while blocking moisture and oxygen, thereby protecting the negative electrode metal layer 50. Accordingly, the third electrolyte film 33 may simultaneously serve as an electrolyte, a separation film, and a protection film. The third electrolyte film 33 may be formed of a solid electrolyte or a polymer electrolyte. For example, LTAP ($Li_{1+x}Ti_{2-x}Al_x(PO_4)_3$) may be used as the third electrolyte film 33. The combined negative electrode layer 50 and the third electrolyte film 33 may be referred to as a protected negative electrode. Accordingly, the electrolyte film 30 may be distributed from the upper surface of the negative electrode metal layer 50 to a surface of the carbon nanotube film 100. The carbon nanotube film 100 is not in direct contact with the negative electrode metal layer 50. The first end portion of the carbon nanotube film 100 contacts the first electrolyte film 31 of the electrolyte film 30. The second end of the carbon nanotube film 100 may directly contact the gas diffusion layer 60.

The metal-air battery 1 having the above-described structure may generate electricity by the oxidation of metal and reduction of oxygen. For example, when the metal is lithium (Li), lithium and oxygen react with each other during discharge and electricity is generated through a reaction generating lithium peroxide ($Li_2O_2$). Furthermore, during charging, in the lithium peroxide, the lithium metal is reduced and oxygen is generated. Metals other than lithium may be used, and the reaction principle may be the same as lithium. In the present embodiment, during discharge, the metal oxide such as $Li_2O_2$ may be generated between surfaces of the carbon nanotubes 110 in the carbon nanotube film 100 and the electrolyte film 30. Then, the electrolyte film 30 is pushed away from the surfaces of the carbon nanotube film 100. Without being limited by theory, it is understood that the space 40 may retain the electrolyte film 30 inside the metal-air battery 1 without eluting the electrolyte film 30 from the metal-air battery 1.

For example, FIG. 3 is a cross-sectional view illustrating the metal oxide generated during a discharge operation of the metal-air battery 1 of FIG. 2 and the corresponding change in the position of the electrolyte film 30 due to the generation of the metal oxide. Referring to FIG. 3, during discharge of the metal-air battery 1, a metal oxide is generated as the metal ions move from the negative electrode layer 50 to the electrolyte film 30 and react with the oxygen within the positive electrode 10. As the discharge process continues, the metal oxide grows on the surfaces of the carbon nanotubes 110 to form a metal oxide layer 70. As a result, the metal oxide layer 70 is formed between the surface of the carbon nanotube films 100 and the surface of the electrolyte film 30, and the electrolyte film 30 is pushed away from the carbon nanotube films 100 by the metal oxide layer 70 in a direction perpendicular to the surface of the carbon nanotube film 100. Since the space 40 between the carbon nanotube films 100 is present, the electrolyte film 30 may be retained inside the metal-air battery 1 without being eluted from the metal-air battery 1, at least until the entire space 40 is filled.

The size of the space 40 may be sufficient to accommodate the electrolyte film 30 that is pushed by the metal oxide layer 70. However, when the size of the space 40 is too large, the volume of the metal-air battery 1 may increase. Accordingly, the size of the space 40 may be designed appropriately considering the thickness of the metal oxide layer 70 generated during a discharge operation. In general, the metal oxide layer 70 is a dielectric material having insulating properties. The metal oxide layer 70 with insulating properties may prohibit the electricity generated during the generation of the metal oxide 70 from flowing to the positive electrode 10 for metal-air battery. Accordingly, when the metal oxide layer 70 formed between the carbon nanotube film 100 and the electrolyte film 30 becomes too thick, the performance of the metal-air battery 1 may deteriorate. Considering the above, the metal-air battery 1 may be operated by adjusting the thickness of the metal oxide layer 70 generated on the surfaces of the carbon nanotube films. The thickness of the space 40 is defined as a distance between the electrolyte films 30 facing each other between two neighboring carbon nanotube films 100, when the metal oxide layer 70 is not generated. To provide the positive electrode 10 including the space 40, a method of manufacturing the carbon nanotube film 100 including the carbon nanotubes 110 that are aligned, is described below in detail.

FIG. 4A is a flowchart of a method of manufacturing a carbon nanotube film according to an embodiment, and FIG. 4B is a schematic cross-sectional view of a method of manufacturing a carbon nanotube film 100 according to an embodiment. The carbon nanotube film 100 according to an embodiment, which is included in the positive electrode 10 for metal-air battery, may be formed by using a floating catalyst chemical vapor deposition (FCCVD) method.

Referring to FIGS. 4A and 4B, according to an embodiment, a carbon nanotube precursor 210 and a catalyst precursor 220 may be supplied to the inside of a reaction chamber 200 (S110). According to an embodiment, the carbon nanotube precursor 210 may include ethanol, hexane, methane, toluene, or a combination thereof. Furthermore, according to an embodiment, the catalyst precursor 220 may include a transition metal derivative such as ferrocene, nickelocene, iron pentacarbonyl ($Fe(CO)_5$), a zirconium oxide ($ZrO_2$) nanopowder, a non-metal precursor, or a combination thereof. A stopping agent source material 230, such as carbon disulfide, which is a material that restricts growth of catalyst particles, may be supplied with the carbon nanotube precursor 210 and the catalyst precursor 220. The carbon nanotube precursor 210, the catalyst precursor 220, and the stopping agent source material 230 may be provided to the inside of the reaction chamber 200 by a carrier gas such as hydrogen gas ($H_2$), argon gas ($Ar_2$), helium gas (He), or a combination thereof.

Next, catalyst particles may be generated by pyrolyzing the catalyst precursor 220 inside of the reaction chamber 200 (S120). According to an embodiment, the catalyst precursor 220 introduced into the reaction chamber 200 by the carrier gas moves inside of the reaction chamber 200 in a flow direction. The temperature of the inside of the reaction chamber 200 may increase along the flow direction, and the catalyst precursor 220 may be decomposed at a first start temperature that is a decomposition temperature of the catalyst precursor 220. Catalyst particles 221 may be generated by the decomposition of the catalyst precursor 220, and the generated catalyst particles 221 may grow by combining with each other. Then, the stopping agent source material 230 may be decomposed at a second start temperature, and thus a stopping agent is released from the carrier gas and stops the growth of the catalyst particles 221.

Next, the carbon nanotubes 110 may be generated by pyrolyzing the carbon nanotube precursor 210 supplied to the inside of the reaction chamber 200 (S130). After the second start temperature, when the temperature of the inside of the reaction chamber 200 reaches a third start temperature that is a temperature for generating the carbon nanotubes 110 in the flow direction, the carbon nanotube precursor 210 is decomposed and thus the carbon nanotubes 110 may be formed.

Furthermore, in an embodiment, a densification agent, for example, acetone, may be supplied to the carbon nanotubes 110 in order to facilitate densification of the carbon nanotubes. Accordingly, the carbon nanotubes 110 may be discharged in the form of a plurality of fibers.

Next, the carbon nanotubes 110 are attached onto a surface of a roller portion 260 rotating at a rotation speed around an axis O, and thus the one or more carbon nanotube film 100 may be generated (S140). The speed at which the carbon nanotubes 110 are discharged from the reaction chamber 200 and disposed (attached) onto the surface of the roller portion 260 that rotates around the axis O, may be a speed of greater than or equal to about 1 meter per minute (m/min) and less than or equal to about 100 m/min, or about 1 m/min to about 50 m/min, or in detail greater than or equal to about 1 m/min and less than or equal to about 20 m/min. In an example, when the roller portion 260 having a diameter of about 3 centimeters (cm) rotates at a rotation speed of about 85 rotations per minute (rpm), the carbon nanotubes 110 may be aligned at a speed of less than or equal to 8 m/min along a direction of the axis O of the roller portion 260, without aggregation. In this state, by adjusting the rotation speed of the roller portion 260, the alignment and thickness of the carbon nanotubes 110 may be adjusted. Accordingly, a carbon nanotube layer having a shape of a plate in which the carbon nanotubes 110 are aligned in substantially a single direction may be formed.

Furthermore, according to an embodiment, the roller portion 260 may rotate repeatedly, for example, the roller portion may complete two or more rotations. Accordingly, a plurality of carbon nanotube layers, each separately having a shape of a plate in which the carbon nanotubes 110 are aligned in substantially the same direction, may be stacked on each other to form the carbon nanotube thin film 100.

FIG. 5A is a scanning electron microscope (SEM) image of the carbon nanotube film 100 formed by the method of FIG. 4A. FIG. 5B is a magnified SEM image of the carbon nanotube film 100 of FIG. 5A. FIG. 5C is a schematic view of one of the carbon nanotube film 100 of FIG. 5B. FIG. 5D is a schematic view of the carbon nanotube thin films 100 of FIG. 5B.

Referring to FIG. 5A, the carbon nanotubes 110 according to an embodiment formed by the manufacturing method of FIG. 4A, may be aligned on the roller portion in a direction perpendicular to an extension direction of the carbon nanotubes 110, and as a result, the carbon nanotube layer may be formed. In an example, a total amount of the carbon nanotubes 110 in a carbon nanotube film 100 may be greater than or equal to about 25 μg/cm² and less than or equal to about 5 mg/cm², or greater than or equal to about 100 μg/cm² and less than or equal to about 2 mg/cm², or greater than or equal to about 500 μg/cm² and less than or equal to about 1 mg/cm². In this state, the positive electrode 10 for metal-air battery may be formed to be a self-standing film.

Furthermore, in an example, the carbon nanotubes 110 in the carbon nanotube film 100 according to an embodiment may be, for example, a single walled carbon nanotube (SWNT), a double-walled carbon nanotube (DWNT), a multi-walled carbon nanotube (MWNT), or a combination thereof. Furthermore, the carbon nanotubes 110 included in the carbon nanotube film 100 may be in the form of a fiber including a single carbon nanotubes or a plurality of carbon nanotubes, that is, a bundle of carbon nanotubes, for example, two to twenty-five carbon nanotubes, which together form a single fiber. Furthermore, an average length of each of the carbon nanotubes 110 according to an embodiment may be greater than or equal to about 50 μm and less than or equal to about 1 cm, or greater than or equal to about 100 μm and less than or equal to about 1 cm, or greater than or equal to about 1 millimeter (mm) and less than or equal to about 1 cm. An average diameter of each of the carbon nanotubes 110 may be greater than or equal to about 1 nm and less than or equal to about 50 nm, or greater than or equal to about 1 nm and less than or equal to about 25 nm, or greater than or equal to about 5 nm and less than or equal to about 40 nm. An aspect ratio of each of the carbon nanotubes 110 may be greater than or equal to about $5 \times 10^4$ and less than or equal to about $10^7$, or greater than or equal to about $1 \times 10^5$ and less than or equal to about $10^7$, or greater than or equal to about $1 \times 10^5$ and less than or equal to about $5 \times 10^6$.

The carbon nanotube film may be a thin film, having a thickness from about 1 nm to about 1000 nm, or from about 2 nm to about 500 nm, or from about 2 nm to about 250 nm, or from about 2 nm to about 100 nm.

Referring back to FIG. 4B, the carbon nanotubes 110 may be arranged on the surface of the roller portion 260 as the roller portion rotates. When the carbon nanotubes 110 are arranged on the surface of the roller portion 260 as the roller portion rotates, the carbon nanotubes 110 may not be regularly aligned with each other depending upon the rotation speed of the roller portion 260, and a discharge speed and a discharge direction of the carbon nanotubes 110. For example, referring to FIGS. 5B and 5C, the carbon nanotubes 110 may be arranged on the surface of the roller portion to have a certain alignment angle θ. As used herein, the alignment angle θ is defined as an angle between the extension direction of a single carbon nanotube of the plurality of carbon nanotubes that is set as a reference, and an extension direction of any other of the carbon nanotubes. For example, as illustrated in FIG. 5C, an extension direction of a carbon nanotube 110-1 that is set to be a reference, may be different from an extension direction of another carbon nanotube 110-2. In this state, the carbon nanotube 110-1 that is set as a reference and the carbon nanotube 110-2 are arranged to have an angle equivalent to the alignment angle θ. In an example, a deviation in the alignment angle θ between the carbon nanotubes 110 may be greater than or equal to about 15° and less than or equal to about 45°, or greater than or equal to about 20° and less than or equal to about 40°, or greater than or equal to about 20° and less than or equal to about 30°, in a clockwise or counterclockwise direction. Furthermore, in an example, the Raman intensity ratio ($G_{\parallel}/G_{\perp}$) of a G band of the alignment direction of the carbon nanotubes (parallel direction, $G_{\parallel}$) to the G band of a direction perpendicular to the alignment direction of the carbon nanotubes (perpendicular direction, $G_{\perp}$) may be greater than or equal to about 1.5 and less than or equal to about 4, or greater than or equal to about 1.5 and less than or equal to about 3.5, or greater than or equal to about 1.5 and less than or equal to about 3. The Raman intensity ratio of a parallel G band to a perpendicular G band ($G_{\parallel}/G_{\perp}$), which is related to a degree of alignment of the carbon nanotubes in the carbon nanotube layer, is described further below with reference to FIG. 8A.

According to an embodiment, as a post-treatment of the carbon nanotube thin film 100, the carbon nanotube thin film 100 may be dipped into a solvent, for example, water, acetone, or ethanol, and then dried. By performing the above process, an interval between the individual carbon nanotubes may be decreased according to an effect of surface tension, and a deviation in the alignment angle θ of the carbon nanotubes, and a density of the carbon nanotube film, may be increased.

Referring back to FIG. 4B, the roller portion 260 where the carbon nanotubes 110 are arranged may rotate one or more times, and the number of carbon nanotube layers stacked on each varies according to the number of rotations of the roller portion 260. For example, when the roller portion 260 rotates twice, as illustrated in FIG. 5D, a first carbon nanotube layer 101 and a second carbon nanotube layer 102 may be stacked on each other. The first carbon nanotube layer 101 may include a plurality of first carbon nanotubes 111, and the second carbon nanotube layer 102 may include a plurality of second carbon nanotubes 112. The alignment direction of the first carbon nanotubes 111 and the alignment direction of the second carbon nanotubes 112 may be substantially the same. However, in this state, the first carbon nanotubes 111 included in the first carbon nanotube layer 101 may be arranged such that a deviation of an alignment angle θ1 is greater than or equal to about 15° and less than or equal to about 45°, or greater than or equal to about 20° and less than or equal to about 40°, or greater than or equal to about 20° and less than or equal to about 30°, may be present between a reference carbon nanotube and another carbon nanotube in a clockwise or counterclockwise direction. Furthermore, in an example, the Raman intensity ratio of a G band of the alignment direction of the first carbon nanotubes 111 and a G band of a direction perpendicular to the alignment direction of the first carbon nanotubes may be greater than or equal to about 1.5 and less than or equal to about 4, or greater than or equal to about 1.5 and less than or equal to about 3.5, or greater than or equal to about 1.5 and less than or equal to about 3.

Furthermore, the second carbon nanotubes 112 in the second carbon nanotube layer 102 may be arranged such that a deviation of an alignment angle θ2 that is greater than or equal to about 15° and less than or equal to about 45°, or greater than or equal to about 20° and less than or equal to about 40°, or greater than or equal to about 20° and less than or equal to about 30°, may be provided between the reference carbon nanotube and another carbon nanotube in a clockwise or counterclockwise direction. Furthermore, in an example, the Raman intensity ratio of a G band of the alignment direction of the second carbon nanotubes 112 and a G band of a direction perpendicular to the alignment direction of the second carbon nanotubes, may be greater than or equal to about 1.5 and less than or equal to about 4, or greater than or equal to about 1.5 and less than or equal to about 3.5, or greater than or equal to about 1.5 and less than or equal to about 3.

FIG. 6A is a flowchart of a method of manufacturing a carbon nanotube thin film according to another embodiment. FIG. 6B is a schematic cross-sectional view of a method of manufacturing a carbon nanotube thin film according to another embodiment.

Referring to FIGS. 6A and 6B, steps S210 to S230 are substantially the same as the steps S110 to S130 of FIG. 4A. Accordingly, for convenience of explanation, a separate description regarding the steps S210 to S230 is omitted, and step S240 is mainly discussed below.

Referring to the operation 240 of FIG. 6A, the roller portion 260 rotates around the axis O and simultaneously performs a translational (e.g., sideways) motion in a direction along the axis O. The carbon nanotubes 110 are attached at a speed of greater than or equal to about 1 m/min and less than or equal to about 20 m/min, on a surface of the roller portion 260 as the roller portion simultaneously performs the rotational motion and translational motion, thereby generating the one or more carbon nanotube layers. The carbon nanotubes 110 discharged from the reaction chamber 200 may be attached at a speed of greater than or equal to about 1 m/min and less than or equal to about 100 m/min, or greater than or equal to about 1 m/min and less than or equal to about 50 m/min, or in detail, greater than or equal to about 1 m/min and less than or equal to about 20 m/min, on the surface of the roller portion 260 that simultaneously rotates around the axis O and performs a translational motion in a direction along the axis O. In an example, when the roller portion 260 having a diameter of 3 cm rotates at a rotation speed of 85 rpm, the carbon nanotubes 110 may be aligned in the direction along the axis O of the roller portion 260 at a speed of less than or equal to 8 m/min, without aggregation. Furthermore, when the roller portion 260 simultaneously rotates at a speed of less than or equal to 8 m/min and moves in the direction along the axis O (translational motion) at a speed of 0.7 m/min, the carbon nanotubes 110 may be aligned at an angle in a direction opposite to the direction of the translational motion of the roller portion 260.

FIG. 7A is a SEM image of a carbon nanotube thin film formed by the method of FIG. 6A. FIG. 7B is a magnified SEM image of the carbon nanotube thin film of FIG. 7A. FIG. 7C is a schematic view of the carbon nanotube thin film of FIG. 7A.

Referring back to FIG. 6B, the roller portion 260 where the carbon nanotubes 110 are arranged, may rotate one or more times. With each rotation, a carbon nanotube layer is formed on the roller portion, and so the number of carbon nanotube layers depends upon the number of rotations of the roller portion. The carbon nanotube layers are stacked on each other according to the number of rotations of the roller portion 260. For example, when the roller portion 260 rotates twice, as illustrated in FIGS. 7A and 7C, the first carbon nanotube layer and the second carbon nanotube layer may be stacked on each other. In this state, the first carbon nanotube layer 101 may include the first carbon nanotubes 111, and the second carbon nanotube layer 102 may include the second carbon nanotubes 112. An alignment direction n1 of the first carbon nanotubes 111 and an alignment direction n2 of the second carbon nanotubes 112 may be defined as being perpendicular to the extension direction of the carbon nanotubes. The alignment direction n1 of the first carbon nanotubes 111 and the alignment direction n2 of the second carbon nanotubes 112 may be different from each other due to a translational motion along a direction of the axis O of the roller portion 260. For example, the alignment direction n1 of the first carbon nanotubes 111 and the alignment direction n2 of the second carbon nanotubes 112 may form an angle of greater than or equal to about 15° and less than or equal to about 90°, or an angle of greater than or equal to about 20° and less than or equal to about 75°, or an angle of greater than or equal to about 15° and less than or equal to about 45°.

In an example, when the roller portion 260 having a diameter of 3 cm performs a rotational motion at a rotation speed of about 85 rpm and simultaneously a translational motion at a speed of 0.7 m/min in a direction along the axis O, the carbon nanotubes 110 may be arranged at a speed of about 8 m/min or less. In this state, when no translation motion is present, the alignment direction n1 of the first carbon nanotubes 111 and the alignment direction n2 of the second carbon nanotubes 112 may be inclined in opposite directions and may have an angle greater than or equal to about 19° and less than or equal to about 20° with respect to an alignment direction X of the carbon nanotubes. Accordingly, the alignment direction n1 of the first carbon nanotubes 111 and the alignment direction n2 of the second carbon nanotubes 112 may have a difference in alignment angle of greater than or equal to about 38° and less than or equal to about 40°.

In this state, however, in a process of arranging the carbon nanotubes 110 on the surface of the roller portion 260, the alignment between the carbon nanotubes 110 may not be constant due to the rotation speed of the roller portion 260 or the discharge speed and the discharge direction of the carbon nanotubes 110. Accordingly, as illustrated in FIGS. 7B and 7C, the first carbon nanotubes 111 included in the first carbon nanotube layer 101 and the second carbon nanotubes 112 included in the second carbon nanotube layer 102 may be arranged to have a deviation in alignment angles θ1 and θ2 that are greater than or equal to about 15° and less than about 45° and the Raman intensity ratio $G_\parallel/G_\perp$ that is greater than or equal to 1.5 and less than or equal to 4 in a clockwise or counterclockwise direction, between the reference carbon nanotube and another carbon nanotube.

A carbon nanotube thin film according to the prior art may grow in the shape in which carbon nanotubes in a powder form are arranged, carbon nanotubes formed by the FCCVD method are randomly distributed without being aligned, or a plurality of carbon nanotubes are grown in one direction from an aligned starting point. In the present embodiment, however, as described above, the carbon nanotubes 110 formed by the FCCVD method are arranged on the roller portion that rotates at a certain rotation speed or performs both a rotation and translational motion, and thus a carbon nanotube thin film in which the carbon nanotubes are aligned in a single direction, is provided.

For example, FIG. 8A is a polarized Raman spectrum of Comparative Example 1 in which multi-walled carbon nanotubes formed by the FCCVD method are not aligned, but are randomly distributed. FIG. 8B is a polarized Raman spectrum of Comparative Example 2 in which a plurality of carbon nanotubes are grown in a single direction from an aligned starting point. FIG. 8C is a polarized Raman spectrum of the present embodiment in which double-walled carbon nanotubes formed by the FCCVD method are aligned with each other.

In the Raman spectrum, $I_D$ is a D band peak obtained at about 1353 $cm^{-1}$ of the Raman spectrum and having a diamond structure induced from a surface defect or the sp3 orbital of carbon, and $I_G$ is a G band peak obtained at about 1583 $cm^{-1}$ of the Raman spectrum and having a graphite structure induced from a surface defect or the sp2 orbital of carbon. The intensity ratio of $I_D$ to $I_G$ ($I_D/I_G$) is a measure indicating a degree of crystallization of a carbon based material. For example, when the intensity ratio of $I_D$ to $I_G$ is 1, it means that the degree of crystallization of a carbon based material is 50%. Accordingly, as the intensity ratio $I_D/I_G$ between $I_D$ and $I_G$ decreases, the degree of crystallization of the carbon based material increases. Furthermore, the Raman intensity ratio of a G band of the alignment direction of the carbon nanotubes (parallel direction, $_\parallel$/) to a G band of the direction perpendicular to the alignment direction (perpendicular direction, $G_\perp$), reflects a degree of alignment of the carbon nanotubes in the alignment direction. As the intensity ratio of $G_\parallel$ to $G_\perp$ ($G_\parallel/G_\perp$ ratio) increases, a degree of alignment of carbon nanotubes increases.

The carbon nanotubes 110 according to an embodiment may have an intensity ratio $I_D/I_G$ of less than about 0.5, or less than about 0.3, or less than about 0.1. Furthermore, the Raman intensity ratio of a G band ($G_\parallel/G_\perp$ ratio) of the carbon nanotube film 100 according to an embodiment may be, for example, greater than or equal to 1.5 and less than or equal to 4, or greater than or equal to 1.5 and less than or equal to 3.5, or greater than or equal to 1.5 and less than or equal to 3, and may have a relatively greater value compared to a case in which the multi-walled carbon nanotubes formed by the FCCVD method are not aligned, but instead are randomly distributed, or compared to a case in which a plurality of carbon nanotubes are grown in one direction from an aligned starting point. Thus, a degree of alignment of the carbon nanotubes 110 may be greater than the compared cases.

Referring to FIGS. 8A to 8C and Table 1 below, the intensity ratio $I_D/I_G$ of $I_D$ to $I_G$ for Comparative Example 1, in which the multi-walled carbon nanotubes formed by the FCCVD method are not aligned, but are randomly distributed, Comparative Example 2, in which a plurality of carbon nanotubes are grown in one direction from an aligned starting point, and an example embodiment, it can be seen that the intensity ratio $I_D/I_G$ of the example embodiment has a higher degree of crystallization, compared to Comparative Example 1 and Comparative Example 2. (See Table 1) Furthermore, when the Raman intensity ratio of a G band ($G_\parallel/G_\perp$ ratio) of a carbon nanotube film of Comparative Example 1 is defined to be 1, the Raman intensity ratio of a G band ($G_\parallel/G_\perp$ ratio) of a carbon nanotube film of Comparative Example 2 is 1.655±0.442 and the Raman intensity ratio of a G band ($G_\parallel/G_\perp$ ratio) of the carbon nanotube film 100 of the present embodiment is 2.164±0.117. Thus, it may be seen that a degree of alignment of the carbon nanotube film 100 of the present embodiment is greater than a degree of alignment of the carbon nanotube films of Comparative Example 1 and Comparative Example 2.

TABLE 1

|  | Comparative Example 1 | Comparative Example 2 | Example |
|---|---|---|---|
| $I_D/I_G$ | 0.447 ± 0.045 | 0.310 ± 0.023 | 0.0612 ± 0.0093 |
| $G_\parallel/G_\perp$ | 1 | 1.655 ± 0.442 | 2.164 ± 0.117 |

Surface conductivity of the carbon nanotube film 100 according to an embodiment may be about $5\times10^3$ S/cm or greater, or about $5\times10^4$ S/cm or greater, or about $5\times10^5$ S/cm or greater. Furthermore, a specific conductivity obtained by dividing the conductivity of the carbon nanotube film according to an embodiment by the density of the carbon nanotube film and then normalizing the same may be about $5\times10^2$ (S/cm)/(g/cm$^3$) or greater, for example, about $1\times10^3$ (S/cm)/(g/cm$^3$) or greater, or about $1\times10^4$ (S/cm)/(g/cm$^3$) or greater. In an example, referring to Table 2 below, the conductivity of a carbon nanotube film (Comparative Example 1) including a plurality of carbon nanotubes that are grown in a single direction and the conductivity of a carbon nanotube film (Comparative Example 2) in which carbon nanotubes in a powder form are distributed, is less than $5\times10^3$ S/cm. Meanwhile, the conductivity (S/m) of the carbon nanotube film including a plurality of single-walled carbon nanotubes aligned according to Example 1 and the conductivity of the carbon nanotube film including a plurality of double-walled carbon nanotubes aligned according to Example 2, may be $5\times10^3$ S/cm or greater. In addition, in Comparative Example 1 and Comparative Example 2, the specific conductivity (S/cm)/(g/cm$^3$) obtained by dividing the conductivity of the carbon nanotube film 100 by the density of the carbon nanotube film and then normalizing the same, is less than $5\times10^2$ (S/cm)/(g/cm$^3$), whereas the specific conductivity of Example 1 and Example 2 may be $5\times10^2$ or greater. Accordingly, it may be seen that the conductivity of the carbon nanotube film 100 according to an embodiment, in which the carbon nanotubes formed by the FCCVD method are aligned, is characteristically much greater than the carbon nanotube film manufactured by other methods.

TABLE 2

|  | Comparative Example 1 | Comparative Example 2 | Example 1 | Example 2 |
|---|---|---|---|---|
| Conductivity (S/m) | 3.72 × 10$^3$ | 1.01 × 10$^3$ | 3.33 × 10$^4$ | 2.99 × 10$^4$ |
| Specific Conductivity (S/cm)/(g/cm$^3$) | 4.27 × 10$^2$ | 1.15 × 10$^2$ | 3.49 × 10$^3$ | 3.59 × 10$^3$ |

FIG. 9 is a graph showing changes in the tensile strength of carbon nanotube films according to embodiments and comparative examples.

The tensile strength of the carbon nanotube film according to an embodiment may be about 10 Mpa or greater, or about 15 GPa or greater, or about 20 GPa or greater. Furthermore, the specific tensile strength obtained by dividing the tensile strength of the carbon nanotube film by the density of the carbon nanotube film and then normalizing the same may be greater than or equal to about 0.1 GPa/(g/cm$^3$) and less than or equal to about 1 GPa/(g/cm$^3$), or greater than or equal to about 0.2 GPa/(g/cm$^3$) and less than or equal to about 1 GPa/(g/cm$^3$), or greater than or equal to about 0.5 GPa/(g/cm$^3$) and less than or equal to about 1 GPa/(g/cm$^3$). In an example, referring to FIG. 9 and Table 3 below, while the tensile strength (Mpa) of the carbon nanotube thin film (Comparative Example 1) having a plurality of carbon nanotubes are grown in one direction and the carbon nanotube thin film (Comparative Example 2) in which carbon nanotubes in a powder form are distributed is less than 10, the tensile strength (Mpa) of the carbon nanotube thin film including a plurality of single-walled carbon nanotubes aligned according to Example 1 and the carbon nanotube thin film 100 having a plurality of double-walled carbon nanotubes aligned according to Example 2 may be 10 Mpa or greater. In addition, the specific tensile strength obtained by dividing the tensile strength (MPa) of the carbon nanotube thin film 100 by the density of the carbon nanotube film and then normalizing the same, may be less than 0.1 GPa/(g/cm3) for Comparative Example 1 and Comparative Example 2, whereas the specific tensile strength of the carbon nanotube thin film according to Example 1 and Example 2 may be 0.1 GPa/(g/cm3) or greater. Accordingly, it may be seen that the specific tensile strength of the carbon nanotube film in which the carbon nanotubes formed by the FCCVD method are aligned according to an embodiment, is superior to the specific tensile strength of the carbon nanotube film manufactured in other methods. Accordingly, during charge/discharge of the metal-air battery, a stable structure of the positive electrode may be maintained regardless of volume expansion and contraction which occurs due to the generation and termination of discharge products.

TABLE 3

| | Comparative Example 1 | Comparative Example 2 | Example 1 | Example 2 |
|---|---|---|---|---|
| Tensile strength (Mpa) | 7.98 | 2.41 | 42.67 | 48.19 |
| Specific Tensile strength (GPa/(g/cm$^3$)) | 0.091 | 0.028 | 0.448 | 0.579 |

According to the present embodiment, a metal-air battery including a positive electrode having a space to accommodate expansion which occurs due to the generation of a discharge product and having a porous structure for easily supplying oxygen into the positive electrode may be implemented. Also, a metal-air battery having an increased lifespan may be implemented by preventing discharge of an electrolyte outside of the electrode and reducing the non-reaction area of the positive electrode.

The present disclosure is described with the following examples, but the present disclosure is not limited thereto.

EXAMPLES

Example 1

Manufacture of a Positive Electrode for Metal-Air Battery

Example and Comparative Example: Manufacture of a Lithium-Air Battery

Example

A positive electrode for metal-air battery in which carbon nanotubes are arranged in a tilted lattice structure was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl)imide was added as a positive electrode electrolyte, with respect to carbon nanotubes formed by the FCCVD method and having a loading amount of 0.45 milligrams (mg) as a positive electrode catalyst for metal-air battery.

Comparative Example

A positive electrode for metal-air battery in which carbon nanotubes are arranged in a random structure was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl)imide was added as a positive electrode electrolyte for metal-air battery, with respect to carbon nanotubes (NC2100, Nanocyl) having a loading amount of 0.45 mg as a positive electrode catalyst for metal-air battery.

Gas Diffusion Layer

A commercial carbon sheet (Sigracet® 25BA, SGL Group) was used as a gas diffusion layer.

Manufacture of an Electrolyte Film

An electrolyte film was manufactured by mixing N-butyl-N-methylpyrrolidinium bis(trifluoromethanesulfonyl)imide (KANTO), poly(diallyldimethylammonium bis(trifluoromethanesulfonyl)imide), and lithium bis(trifluoromethylsulphonyl)imide at a weight ratio of 75:17.6:7.4, diluting the mixture with acetonitrile into a solution, and dipping a polyethylene (PE) separation film (Entek EPX) in the solution and then drying the polyethylene (PE) separation film (Entek EPX).

Manufacture of a Lithium-Air Battery

A lithium-air battery was manufactured by sequentially stacking the electrolyte film, the positive electrode, and the gas diffusion layer, which are manufactured as above, on a lithium foil negative electrode.

Evaluation Example: Discharge Properties and Energy Density Evaluation

Full discharge and charge were performed at a current density of 0.24 mA/cm$^2$, at 80° C., and in an oxygen atmosphere. A discharge capacity (mAh/g) value and an average voltage (V) obtained in the discharge process were measured, and a result of the measurement is shown in FIG. 10A. A discharge capacity (mAh/g) according to a charge/discharge cycle was measured and is shown in FIG. 10B.

Referring to FIG. 10A, the lithium-air battery manufactured according to the example appears to have a 20% increase in an initial discharge capacity, compared to the lithium-air battery manufactured according to the comparative example. Furthermore, referring to FIG. 10B, the lithium-air battery manufactured according to the example appears to have an 84% increase in lifespan, compared to the lithium-air battery manufactured according to the comparative example. Without being limited by theory, it is believed that the above-described increases may be possible because, in the example in which an empty space is present between the carbon nanotube films, a sufficient space for forming a metal oxide ($Li_2O_2$) is secured and thus an oxygen diffusion channel may be secured.

Example 2

Manufacture of a Positive Electrode for Metal-Air Battery)

Example and Comparative Example: Manufacture of a Lithium-Air Battery

Example

A positive electrode for metal-air battery in which carbon nanotubes are arranged in a tilted lattice structure was manufactured by mixing, at a weight ratio of 1:2.3, 1-ethyl-3-methylimidazolium bis(trifluoromethylsulfonyl)imide (Aldrich), to which 0.5 M lithium bis(trifluoromethylsulphonyl)imide was added as a positive electrode electrolyte for metal-air battery, and carbon nanotubes (NC2100, Nanocyl) formed by the FCCVD method and having a loading amount of 0.45 mg as a positive electrode catalyst for metal-air battery.

Comparative Example

A positive electrode for metal-air battery in which carbon nanotubes are arranged in a random structure was manufactured by mixing, at a weight ratio of 1:2.3, 1-ethyl-3-methylimidazolium bis(trifluoromethylsulfonyl)imide (Aldrich), to which 0.5 M lithium bis(trifluoromethylsulphonyl) imide was added as a positive electrode electrolyte for metal-air battery, and carbon nanotubes (NC2100, Nanocyl) having a loading amount of 0.45 mg as a positive electrode catalyst for metal-air battery.

Gas Diffusion Layer

A commercial carbon sheet (Sigracet 25BA, SGL Group) was used as a gas diffusion layer.

Manufacture of an Electrolyte Film

An electrolyte film was manufactured by mixing N-butyl-N-methylpyrrolidinium bis(trifluoromethanesulfonyl)imide (KANTO), poly(diallyldimethylammonium bis(trifluoromethanesulfonyl)imide), and lithium bis(trifluoromethylsulphonyl)imide at a weight ratio of 75:17.6:7.4, diluting the mixture with acetonitrile into a solution, and dipping a polyethylene (PE) separation film (Entek EPX) in the solution and then drying a polyethylene (PE) separation film (Entek EPX).

Manufacture of a Lithium-Air Battery

A lithium-air battery was manufactured by sequentially stacking the electrolyte film, the positive electrode for metal-air battery, and the gas diffusion layer, which are manufactured as above, on a lithium foil negative electrode.

Evaluation Example: Discharge Properties and Energy Density Evaluation

Full discharge and charge of the metal-air batteries were performed at a current density of 0.24 mA/cm$^2$, at 80° C., and in an oxygen atmosphere. A discharge capacity (mAh/g) value and an average voltage (V) obtained in the discharge process were measured, and a result of the measurement is shown in FIG. 11.

Referring to FIG. 11, the lithium-air battery manufactured according to the example appears to have a 25% to 50% increase in an initial discharge capacity, compared to the lithium-air battery manufactured according to the comparative example.

Example 3

Manufacture of a Positive Electrode for Metal-Air Battery

Example and Comparative Example: Manufacture of a Lithium-Air Battery

Example

A positive electrode for metal-air battery in which carbon nanotubes are arranged in a tilted lattice structure was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl)imide was added as a positive electrode electrolyte for metal-air battery, with respect to carbon nanotubes formed by the FCCVD method and having a specific surface area of 150 m$^2$/g as a positive electrode catalyst for metal-air battery.

Comparative Example 1

A positive electrode for metal-air battery in which carbon nanotubes are arranged in a powder form having pores was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl)imide was added as a positive electrode electrolyte for metal-air battery, with respect to carbon nanotubes (cm$^2$50) having a specific surface area of 250 m$^2$/g as a positive electrode catalyst for metal-air battery.

Comparative Example 2

A positive electrode for metal-air battery in which carbon nanotubes are arranged in a powder form having pores was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl)imide was added as a positive electrode electrolyte for metal-air battery, with respect to carbon nanotubes (NC2100, Nanocyl) having a specific surface area of 500 m$^2$/g as a positive electrode catalyst for metal-air battery.

Comparative Example 3

A positive electrode for metal-air battery in which carbon nanotubes are arranged in a random structure was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl) imide was added as a positive electrode electrolyte for metal-air battery, with respect to carbon nanotubes having a specific surface area of 150 m$^2$/g as a positive electrode catalyst for metal-air battery.

Comparative Example 4

A positive electrode for metal-air battery in which carbon nanotubes are arranged in a vertical growth structure was manufactured by mixing, at an excess weight ratio, 1-ethyl-3-methylimidazolium bis(trifluoromethylsulfonyl)imide (Aldrich), to which 0.5 M lithium bis(trifluoromethylsulphonyl)imide was added as a positive electrode electrolyte for metal-air battery, with respect to carbon nanotubes having a specific surface area of 50 m$^2$/g as a positive electrode catalyst for metal-air battery.

Gas Diffusion Layer

A commercial carbon sheet (Sigracet 25BA, SGL Group) was used as a gas diffusion layer.

Manufacture of an Electrolyte Film

An electrolyte film was manufactured by mixing N-butyl-N-methylpyrrolidinium bis(trifluoromethanesulfonyl)imide (KANTO), poly(diallyldimethylammonium bis(trifluoromethanesulfonyl)imide), and lithium bis(trifluoromethylsulphonyl)imide at a weight ratio of 75:17.6:7.4, diluting the mixture with acetonitrile into a solution, and dipping a polyethylene (PE) separation film (Entek EPX) in the solution and then drying the polyethylene (PE) separation film (Entek EPX).

Manufacture of a Lithium-Air Battery

A lithium-air battery was manufactured by sequentially stacking the electrolyte film, the positive electrode for metal-air battery, and the gas diffusion layer, which are manufactured as above, on a lithium foil negative electrode.

Evaluation Example: Discharge Properties and Energy Density Evaluation

Full discharge and charge were performed at a current density of 0.24 mA/cm$^2$, at 80° C., and in an oxygen atmosphere. A discharge capacity (mAh/g) value and an average voltage (V) obtained in the discharge process were measured, and a result of the measurement is shown in FIG. 12A. A discharge capacity (mAh/g) according to repetition of a charge/discharge cycle was measured and shown in FIG. 12B.

Referring to FIG. 12A, the lithium-air battery manufactured according to the example appears to have an increase in the discharge capacity, compared to the lithium-air batteries manufactured according to Comparative Examples 1-4. Furthermore, referring to FIG. 12B, the lithium-air battery manufactured according to the example appears to have an increase in the lifespan, compared to the lithium-air batteries manufactured according to Comparative Examples 1-4. Without being limited by theory, it is believed that the above-described increases may result because, in the example, there is an empty space present between the carbon nanotube films, and thus a sufficient space for forming metal oxide (Li$_2$O$_2$) is secured and thus an oxygen diffusion channel may be secured.

Although the metal-air battery having a positive electrode structure for metal-air battery having the above-described space for a metal oxide are described with reference to the embodiments illustrated in the drawings, it should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A positive electrode for metal-air battery, comprising:
   a plurality of carbon nanotube films comprising
      a first carbon nanotube layer comprising a plurality of first carbon nanotubes; and
      a second carbon nanotube layer adjacent to the first carbon nanotube layer and comprising a plurality of second carbon nanotubes,
   wherein an alignment direction of the plurality of first carbon nanotubes in the first carbon nanotube layer and an alignment direction of the plurality of second carbon nanotubes in the second carbon nanotube layer are different from each other,
   wherein an angle between an alignment direction of the plurality of first carbon nanotubes in the first carbon nanotube layer and an alignment direction of the plurality of second carbon nanotubes in the second carbon nanotube layer is greater than or equal to 15° and less than or equal to 90°, wherein the alignment direction of the first carbon nanotubes and the alignment direction of the second carbon nanotubes is defined as being perpendicular to an extension direction of the carbon nanotubes, and
   wherein an average specific tensile strength of the plurality of carbon nanotube films is greater than or equal to about 0.1 gigapascal per gram per cubic centimeter and less than or equal to about 1 gigapascal per gram per cubic centimeter,
   wherein a Raman intensity ration of a G band of the alignment direction of the plurality of first carbon nanotubes to a G band in a direction perpendicular to the alignment direction of the plurality of first carbon nanotubes, is greater than or equal to about 1.5 and less than or equal to about 4 and
   a Raman intensity ratio of a G band of an alignment direction of the plurality of second carbon nanotubes to a G band of a direction perpendicular to the alignment direction of the plurality of second carbon nanotubes is greater than or equal to about 1.5 and less than or equal to about 4.

2. The positive electrode for metal-air battery of claim 1, wherein the first carbon nanotube layer and the second carbon nanotube layer are stacked on each other.

3. The positive electrode for metal-air battery of claim 1, further comprising:
   an electrolyte film on a surface of each of the plurality of carbon nanotube films; and
   a space between each of the plurality of carbon nanotube films, wherein the space is configured such that the electrolyte film is pushed by a metal oxide generated during discharge of the metal-air battery in a direction away from each of the plurality of carbon nanotube films.

4. The positive electrode for metal-air battery of claim 3, wherein the space is defined by a surface of the electrolyte film.

5. The positive electrode for metal-air battery of claim 1, wherein an alignment angle of the plurality of first carbon nanotubes has a deviation of about 15° to about 45° in a clockwise or counterclockwise direction, and
   an alignment angle of the plurality of second carbon nanotubes has a deviation of about 15° to about 45° in a clockwise or counterclockwise direction.

6. The positive electrode for metal-air battery of claim 1, wherein the first carbon nanotube layer and the second carbon nanotube layer each have a flat plate shape.

7. The positive electrode for metal-air battery of claim 1, wherein an aspect ratio of a carbon nanotube is greater than or equal to about $5 \times 10^4$ and less than or equal to about $1 \times 10^7$.

8. The positive electrode for metal-air battery of claim 1, wherein an average length of the plurality of first carbon nanotubes, the plurality of second carbon nanotubes, or a combination thereof is greater than or equal to about 50 micrometers and less than or equal to 1 centimeter.

9. The positive electrode for metal-air battery of claim 1, wherein an average diameter of the plurality of first carbon nanotubes, the plurality of second carbon nanotubes, or a combination thereof is greater than or equal to about 1 nanometer and less than or equal to about 50 nanometers.

10. The positive electrode for metal-air battery of claim 1, wherein a total amount of a carbon nanotube in a carbon nanotube film is greater than or equal to 25 micrograms per square centimeter and less than or equal to 5 milligrams per square centimeter.

11. The positive electrode for metal-air battery of claim 1, wherein an average conductivity of the plurality of carbon nanotube thin film is greater than or equal to about $5 \times 10^2$ Siemens per centimeter per grams per cubic centimeter.

12. The positive electrode for metal-air battery of claim 1, wherein a carbon nanotube comprises a single walled carbon nanotube, a double-walled carbon nanotube, a multi-walled carbon nanotube, or a combination thereof.

13. A metal-air battery comprising:
a negative electrode layer;
a positive electrode layer; and
a gas diffusion layer configured to supply oxygen to the positive electrode layer,
wherein the positive electrode layer comprises:
a plurality of carbon nanotube thin films comprising
a first carbon nanotube layer comprising a plurality of first carbon nanotubes; and
a second carbon nanotube layer adjacent to the first carbon nanotube layer and comprising
a plurality of second carbon nanotubes,
wherein an alignment direction of the plurality of first carbon nanotubes in the first carbon nanotube layer and an alignment direction of the plurality of second carbon nanotubes in the second carbon nanotube layer are different from each other,
wherein an angle between an alignment direction of the plurality of first carbon nanotubes in the first carbon nanotube layer and an alignment direction of the plurality of second carbon nanotubes in the second carbon nanotube layer is greater than or equal to 15° and less than or equal to 90°, wherein the alignment direction of the first carbon nanotubes and the alignment direction of the second carbon nanotubes is defined as being perpendicular to an extension direction of the carbon nanotubes, and
wherein an average specific modulus of the plurality of carbon nanotube films is greater than or equal to about 0.1 gigapascal per gram per cubic centimeter and less than or equal to about 1 gigapascal per gram per cubic centimeter,
wherein a Raman intensity ratio of a G band of the alignment direction of the plurality of first carbon nanotubes to a G band in a direction perpendicular to the alignment direction of the plurality of first carbon nanotubes, is greater than or equal to about 1.5 and less than or equal to about 4, and
a Raman intensity ratio of a G band of an alignment direction of the plurality of second carbon nanotubes to a G band of a direction perpendicular to the alignment direction of the plurality of second carbon nanotubes is greater than or equal to about 1.5 and less than or equal to about 4.

14. The metal-air battery of claim 13, further comprising:
an electrolyte film disposed on a surface of each of the plurality of carbon nanotube films; and
a space between each of the plurality of carbon nanotube films, wherein the space is configured such that the electrolyte film is pushed by a metal oxide generated during discharge of the metal-air battery in a direction away from each of the plurality of first carbon nanotubes and the plurality of second carbon nanotubes.

15. The metal-air battery of claim 13, wherein an alignment angle of the plurality of first carbon nanotubes has a deviation of about 15° to 45° in a clockwise or counterclockwise direction, and
an alignment angle of the plurality of second carbon nanotubes has a deviation of about 15° to 45° in a clockwise or counterclockwise direction.

16. The metal-air battery of claim 13, wherein the first carbon nanotube layer and the second carbon nanotube layer have a flat plate shape.

17. The metal-air battery of claim 13, wherein an aspect ratio of a carbon nanotube is greater than or equal to about $5 \times 10^4$ and less than or equal to about $1 \times 10^7$.

18. The metal-air battery of claim 13, wherein an average length of a carbon nanotube in the plurality of carbon first nanotubes, the plurality of second carbon nanotubes, or a combination thereof is greater than or equal to 50 micrometers and less than or equal to 1 centimeters.

19. The metal-air battery of claim 13, wherein an average diameter of the plurality of first carbon nanotubes, the plurality of second carbon nanotubes, or a combination thereof is greater than or equal to 1 nanometer and less than or equal to 50 nanometers.

20. The metal-air battery of claim 13, wherein a total amount of a carbon nanotube in a carbon nanotube film is greater than or equal to about 25 micrograms per square centimeter and less than or equal to about 5 micrograms per square centimeter.

21. The metal-air battery of claim 13, wherein an average conductivity of the plurality of carbon nanotube films is greater than or equal to about $5 \times 10^2$ Siemens per centimeter per grams per cubic centimeter.

22. The metal-air battery of claim 13, wherein a carbon nanotube is one of single walled carbon nanotube, a double-walled carbon nanotube, a multi-walled carbon nanotube, or a combination thereof.

* * * * *